US012722448B2

(12) United States Patent
Dong et al.

(10) Patent No.: US 12,722,448 B2

(45) Date of Patent: Sep. 1, 2026

(54) THERMAL MANAGEMENT SYSTEM AND CONTROL METHOD FOR SAME

(71) Applicant: SANHUA HOLDING GROUP CO., LTD., Shaoxing City (CN)

(72) Inventors: Junqi Dong, Shaoxing City (CN); Weiwei Zhang, Shaoxing City (CN)

(73) Assignee: SANHUA HOLDING GROUP CO., LTD., Shaoxing City (CN)

( * ) Notice: Subject to any disclaimer, the term of this patent is extended or adjusted under 35 U.S.C. 154(b) by 272 days.

(21) Appl. No.: 18/232,801

(22) Filed: Aug. 10, 2023

(65) Prior Publication Data

US 2023/0382181 A1 Nov. 30, 2023

Related U.S. Application Data

(63) Continuation of application No. PCT/CN2022/073722, filed on Jan. 25, 2022.

(30) Foreign Application Priority Data

Feb. 10, 2021 (CN) ........................ 202110182465.3

(51) Int. Cl.
*B60H 1/00* (2006.01)
*B60H 1/32* (2006.01)
(Continued)

(52) U.S. Cl.
CPC ..... *B60H 1/00278* (2013.01); *B60H 1/00392* (2013.01); *B60H 1/32281* (2019.05);
(Continued)

(58) Field of Classification Search
CPC ........... B60H 1/00278; B60H 1/32284; B60H 1/32281; B60H 1/00392; B60H 1/323;
(Continued)

(56) References Cited

U.S. PATENT DOCUMENTS 10,639,957 B2 5/2020 Koberstein et al.
10,864,824 B2 12/2020 Szkrybalo et al.
(Continued)

FOREIGN PATENT DOCUMENTS

CN 107639992 A 1/2018
CN 108571834 A 9/2018
(Continued)

*Primary Examiner* — Nael N Babaa
(74) *Attorney, Agent, or Firm* — Cheng-Ju Chiang

(57) ABSTRACT

A thermal management system includes a primary system and a secondary system. The primary system includes a primary refrigerant system and a primary coolant system. The primary system includes a first heat exchanger having a first heat exchange portion and a second heat exchange portion. The secondary system includes a secondary refrigerant system and a secondary coolant system. The secondary system includes a third heat exchanger having a third heat exchange portion and a fourth heat exchange portion. The thermal management system includes a battery heat exchange assembly. In a battery rapid heat dissipation mode, the battery heat exchange assembly is communicated with the second heat exchange portion and the fourth heat exchange portion. Coolant flowing through the second heat exchange portion and the fourth heat exchange portion can quickly dissipate the heat of the battery. A control method of the thermal management system is also disclosed.

15 Claims, 11 Drawing Sheets

(51) Int. Cl.

| | |
|---|---|
| ***H01M 10/613*** | (2014.01) |
| ***H01M 10/625*** | (2014.01) |
| ***H01M 10/63*** | (2014.01) |
| ***H01M 10/6568*** | (2014.01) |
| ***H01M 10/6569*** | (2014.01) |
| ***H01M 10/663*** | (2014.01) |

(52) U.S. Cl.

CPC ......... *B60H 1/32284* (2019.05); *B60H 1/323* (2013.01); *H01M 10/613* (2015.04); *H01M 10/625* (2015.04); *H01M 10/63* (2015.04); *H01M 10/6568* (2015.04); *H01M 10/6569* (2015.04); *H01M 10/663* (2015.04); *B60H 2001/00307* (2013.01); *B60H 2001/00928* (2013.01); *H01M 2220/20* (2013.01); *Y02E 60/10* (2013.01); *Y02T 10/70* (2013.01)

(58) Field of Classification Search

CPC ........... B60H 2001/00307; B60H 2001/00928; H01M 10/613; H01M 10/625; H01M 10/63; H01M 10/6568; H01M 10/6569; H01M 10/663

See application file for complete search history.

(56) References Cited

U.S. PATENT DOCUMENTS

| | | | | |
|---|---|---|---|---|
| 2009/0249802 | A1 | 10/2009 | Nemesh et al. | |
| 2012/0168125 | A1 | 7/2012 | Johnston et al. | |
| 2020/0198443 | A1 * | 6/2020 | Kato | B60H 1/00278 |
| 2020/0259229 | A1 | 8/2020 | Wu et al. | |
| 2021/0221199 | A1 * | 7/2021 | Lee | B60H 1/22 |

FOREIGN PATENT DOCUMENTS

| | | | |
|---|---|---|---|
| CN | 108688441 | A | 10/2018 |
| CN | 109311366 | A | 2/2019 |
| CN | 110422027 | A | 11/2019 |
| CN | 111231656 | A | 6/2020 |
| CN | 111403850 | A | 7/2020 |
| CN | 211829111 | U | 10/2020 |
| CN | 112046239 | A | 12/2020 |
| CN | 112339527 | A | 2/2021 |
| CN | 113173048 | A | 7/2021 |
| CN | 215204348 | U | 12/2021 |
| KR | 10-2004-0072247 | A | 8/2004 |
| KR | 10-2020-0038032 | A | 4/2020 |
| WO | 2022/170965 | A1 | 8/2022 |

* cited by examiner

THERMAL MANAGEMENT SYSTEM AND CONTROL METHOD FOR SAME

CROSS-REFERENCE TO RELATED APPLICATION

The present disclosure is a bypass continuation of National Phase conversion of International (PCT) Patent Application No. PCT/CN2022/073722, filed on Jan. 25, 2022, which further claims priority of a Chinese Patent Application No. 202110182465.3, filed on Feb. 10, 2021 and titled "THERMAL MANAGEMENT SYSTEM", the entire content of which is incorporated in this application by reference.

TECHNICAL FIELD

The present disclosure relates to the technical field of thermal management, and in particular to a thermal management system and a control method of the thermal management system.

BACKGROUND

A thermal management system of an electric vehicle is capable of adjusting the environmental temperature in a passenger compartment and the temperature of a battery. In the related art, the thermal management system includes a refrigerant system and a coolant system. The thermal management system includes a first heat exchanger. The first heat exchanger includes a first heat exchange portion and a second heat exchange portion which are not communicated. The first heat exchange portion and the second heat exchange portion are configured to perform heat exchange. The refrigerant system includes a compressor, a throttling device and a second heat exchanger. The compressor, the first heat exchange portion, the throttling device and the second heat exchanger are communicated to form a circuit. The coolant system includes a battery heat exchange assembly. The battery heat exchange assembly is configured to communicate with the second heat exchange portion so as to form a circuit. In the thermal management system in the related art, the battery can only exchange heat with the coolant flowing through the second heat exchange portion. When the battery generates a huge amount of heat, the heat of the battery cannot be dissipated quickly.

SUMMARY

In view of the above-mentioned problems existing in related technologies, the present disclosure provides the following technical solution: a thermal management system, including: a primary system and a secondary system; the primary system including a primary refrigerant system and a primary coolant system; the primary system including a first heat exchanger; the first heat exchanger including a first heat exchange portion and a second heat exchange portion which are not communicated; the first heat exchange portion and the second heat exchange portion being configured to perform heat exchange; the primary refrigerant system including a first compressor, a second heat exchanger, a first throttling device and the first heat exchange portion; the primary coolant system including the second heat exchange portion; the secondary system including a secondary refrigerant system and a secondary coolant system; the secondary system including a third heat exchanger; the third heat exchanger including a third heat exchange portion and a fourth heat exchange portion which are not communicated; the third heat exchange portion and the fourth heat exchange portion being configured to perform heat exchange; the secondary refrigerant system including a second compressor, a fourth heat exchanger, a second throttling device and the third heat exchange portion; the secondary coolant system including the fourth heat exchange portion; the thermal management system including a battery heat exchange assembly;

the thermal management system having a battery rapid heat dissipation mode; wherein in the battery rapid heat dissipation mode: an outlet of the first compressor communicates with a first port of the second heat exchanger; a second port of the second heat exchanger communicates with a first port of the first throttling device; a second port of the first throttling device communicates with a first port of the first heat exchange portion; a second port of the first heat exchange portion communicates with an inlet of the first compressor; the battery heat exchange assembly communicates with the second heat exchange portion; an outlet of the second compressor communicates with a first port of the fourth heat exchanger; a second port of the fourth heat exchanger communicates with a first port of the second throttling device; a second port of the second throttling device communicates with a first port of the third heat exchange portion; a second port of the third heat exchange portion communicates with an inlet of the second compressor; the battery heat exchange assembly communicates with the fourth heat exchange portion.

The thermal management system in the present disclosure includes the primary system and the secondary system. In the battery rapid heat dissipation mode, in the primary system, the battery heat exchange assembly communicates with the second heat exchange portion. In the secondary system, the battery heat exchange assembly communicates with the fourth heat exchange portion. The coolant flowing through the second heat exchange portion is capable of absorbing the heat of the battery, and the coolant flowing through the fourth heat exchange portion is also capable of absorbing the heat of the battery, so that the heat of the battery can be quickly dissipated.

The present disclosure also provides the following technical solution: a control method of a thermal management system, the thermal management system including a primary system, a secondary system and a control system; the control system including a controller which is configured to execute the control method of the thermal management system, so as to control a working state of the thermal management system; the primary system including a primary refrigerant system and a primary coolant system which are not communicated; the primary system including a first heat exchanger; the first heat exchanger including a first heat exchange portion and a second heat exchange portion which are not communicated; the first heat exchange portion and the second heat exchange portion being configured to perform heat exchange; the primary refrigerant system including a first compressor, a second heat exchanger, a first throttling device and the first heat exchange portion; the primary coolant system including the second heat exchange portion; the secondary system including a secondary refrigerant system and a secondary coolant system which are not communicated; the secondary system including a third heat exchanger; the third heat exchanger including a third heat exchange portion and a fourth heat exchange portion which are not communicated; the third heat exchange portion and the fourth heat exchange portion being configured to perform heat exchange; the secondary refrigerant system including a second compressor, a fourth heat exchanger, a second throttling device and the third heat exchange portion; the secondary coolant system including the fourth heat exchange portion; the thermal management system including a battery heat exchange assembly;

wherein the control method of the thermal management system includes: the controller controls the thermal management system to enter a battery rapid heat dissipation mode; in the battery rapid heat dissipation mode, in the primary system, an outlet of the first compressor communicates with a first port of the second heat exchanger; a second port of the second heat exchanger communicates with a first port of the first throttling device; a second port of the first throttling device communicates with a first port of the first heat exchange portion; the second port of the first heat exchange portion communicates with an inlet of the first compressor; the battery heat exchange assembly communicates with the second heat exchange portion; in the secondary system, an outlet of the second compressor communicates with a first port of the fourth heat exchanger; the second port of the fourth heat exchanger communicates with a first port of the second throttling device; the second port of the second throttling device communicates with a first port of the third heat exchange portion; a second port of the third heat exchange portion communicates with an inlet of the second compressor; the battery heat exchange assembly communicates with the fourth heat exchange portion.

In the control method of the thermal management system in the present disclosure, the controller controls the thermal management system to enter the battery rapid heat dissipation mode. In the battery rapid heat dissipation mode, in the primary system, the battery heat exchange assembly communicates with the second heat exchange portion. In the secondary system, the battery heat exchange assembly communicates with the fourth heat exchange portion. The coolant flowing through the second heat exchange portion is capable of absorbing the heat of the battery, and the coolant flowing through the fourth heat exchange portion is also capable of absorbing the heat of the battery, so that the heat of the battery can be quickly dissipated.

DETAILED DESCRIPTION

Figure 1:
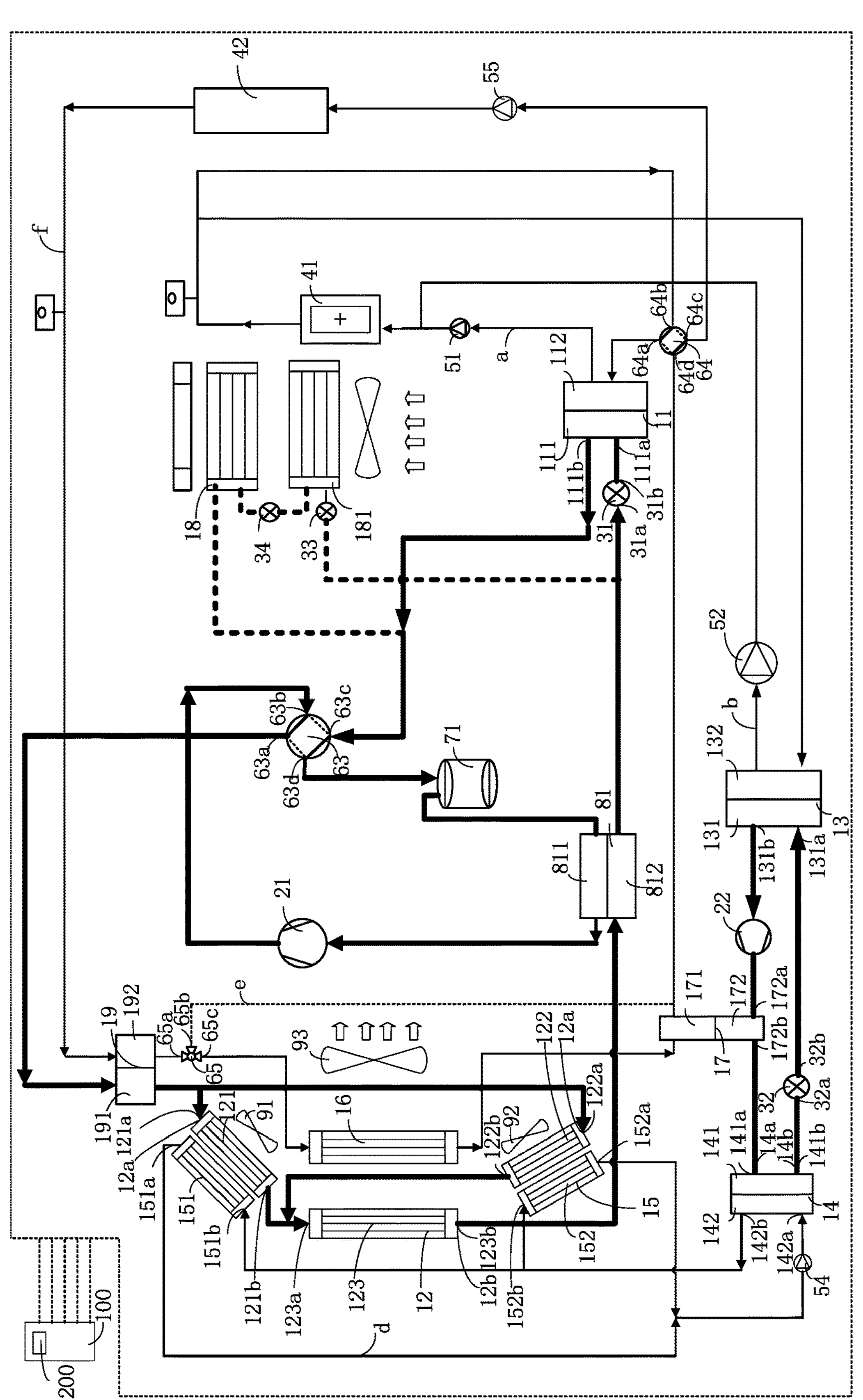
FIG. 1 is a schematic diagram of a working principle of a battery rapid heat dissipation mode in an embodiment of a thermal management system of the present disclosure.

Reference will now be made in detail to the exemplary embodiments, examples of which are illustrated in accompanying drawings. When the following description refers to the accompanying drawings, the same numerals in different drawings refer to the same or similar elements unless otherwise indicated. The embodiments described in the following exemplary implementations do not represent all implementations consistent with the present disclosure. Rather, they are merely examples of apparatuses and methods consistent with aspects of the present disclosure as recited in the appended claims.

The thermal management system of the exemplary embodiments of the present disclosure will be described in detail below with reference to the accompanying drawings. In the case of no conflict, the features in the following embodiments and implementations may complement each other or be combined with each other.

According to a specific embodiment of the thermal management system of the present disclosure, as shown in FIG. 1 to FIG. 6, the thermal management system includes a primary system and a secondary system. The primary system includes a primary refrigerant system and a primary coolant system. The secondary system includes a secondary refrigerant system and a secondary coolant system. Refrigerant circulates in the primary refrigerant system and the secondary refrigerant. Coolant circulates in the primary coolant system and the secondary coolant system. The refrigerant in the refrigerant system and the coolant in the coolant system are isolated from each other so as not to be in fluid communication with each other. The refrigerant can be R134A or carbon dioxide or other heat exchange medium. The coolant can be a mixed solution of ethanol and water.

The primary system includes a first compressor 21, a third flow path switching device 63, a first heat exchanger 11, a second heat exchanger 12, a first throttling device 31, an eighth heat exchanger 18, a ninth heat exchanger 181, a third throttling device 33, a fourth throttling device 34, an intermediate heat exchanger 81, a gas-liquid separator 71, a first pump 51, a battery heat exchange assembly 41, a sixth heat exchanger 16, a fifth pump 55 and a tenth heat exchanger 19.

The first heat exchanger 11 includes a first heat exchange portion 111 and a second heat exchange portion 112 which are not communicated. Both the first heat exchange portion 111 and the second heat exchange portion 112 define flow channels. The flow channel of the first heat exchange portion 111 is used for circulating refrigerant. The flow channel of the second heat exchange portion 112 is used for circulating coolant. The refrigerant circulating in the first heat exchange portion 111 is capable of exchanging heat with the coolant circulating in the second heat exchange portion 112. The tenth heat exchanger 19 includes a ninth heat exchange portion 191 and a tenth heat exchange portion 192 which are not communicated. Both the ninth heat exchange portion 191 and the tenth heat exchange portion 192 define flow channels. The flow channel of the ninth heat exchange portion 191 is used for circulating refrigerant. The flow channel of the tenth heat exchange portion 192 is used for circulating coolant. The refrigerant circulating in the ninth heat exchange portion 191 is capable of exchanging heat with the coolant circulating in the tenth heat exchange portion 192.

Referring to FIG. 1 to FIG. 6, the primary refrigerant system includes the first compressor 21, the third flow path switching device 63, the second heat exchanger 12, the first throttling device 31, the eighth heat exchanger 18, the ninth heat exchanger 181, the third throttling device 33 and the fourth throttling device 34. The first compressor 21, the third flow path switching device 63, the second heat exchanger 12, the first throttling device 31 and the first heat exchange portion 111 are capable of being communicated so as to form a loop. The first compressor 21, the third flow path switching device 63, the second heat exchanger 12, the third throttling device 33, the ninth heat exchanger 181, the fourth throttling device 34 and the eighth heat exchanger 18 are capable of being communicated so as to form a loop. A first port 31*a* of the first throttling device 31 is capable of communicating with a second port 12*b* of the second heat exchanger 12; a second port 31*b* of the first throttling device 31 is capable of communicating with a first port 111*a* of the first heat exchange portion 111; a second port 111*b* of the first heat exchange portion 111 is capable of communicating with the third flow path switching device 63; the third throttling device 33 is capable of communicating with the second port 12*b* of the second heat exchanger 12; the third throttling device 33 is capable of communicating with the ninth heat exchanger 181; the ninth heat exchanger 181 is capable of communicating with the fourth throttling device 34; the fourth throttling device 34 is capable of communicating with the eighth heat exchanger 18; and the eighth heat exchanger 18 is capable of communicating with the third flow path switching device 63. That is, the flow path where the eighth heat exchanger 18, the ninth heat exchanger 181, the third throttling device 33 and the fourth throttling device 34 are located, and the flow path where the first heat exchange portion 111 and the first throttling device 31 are located are disposed in parallel. The eighth heat exchanger 18 and the ninth heat exchanger 181 are air-cooled heat exchangers. Optionally, the eighth heat exchanger 18 and the ninth heat exchanger 181 may be micro-channel heat exchangers. The eighth heat exchanger 18 and the ninth heat exchanger 181 are indoor heat exchangers. In other alternative embodiments, the primary refrigerant system may not include the eighth heat exchanger 18, the ninth heat exchanger 181, the third throttling device 33 and the fourth throttling device 34. The first compressor 21, the third flow path switching device 63, the second heat exchanger 12, the first throttling device 31 and the first heat exchange portion 111 are capable of communicating to form a loop.

The first throttling device 31, the third throttling device 33 and the fourth throttling device 34 are used to regulate the refrigerant flow in the primary refrigerant system. The first throttling device 31 includes a throttling state and a cut-off state. In the throttling state, the first throttling device 31 throttles the refrigerant. In the cut-off state, the first throttling device 31 cuts off the refrigerant, so that the flow path where the first throttling device 31 is located is not conducted. Optionally, the first throttling device 31 may be a two-way throttle valve. The first throttling device 31 can also be a combination of other valve components, as long as it includes a throttling state and a cut-off state, and has a bidirectional throttling function in the throttling state. The third throttling device 33 includes a throttling state, a cut-off state and a full opening state. In the throttling state, the third throttling device 33 throttles the refrigerant. In the cut-off state, the third throttling device 33 cuts off the refrigerant, so that the flow path where the third throttling device 33 is located is not conducted. In the full open state, the third throttling device 33 acts as a conduit. The fourth throttling device 34 includes a throttling state, a cut-off state and a full opening state. In the throttling state, the fourth throttling device 34 throttles the refrigerant. In the cut-off state, the fourth throttling device 34 cuts off the refrigerant, so that the flow path where the fourth throttling device 34 is located is not conducted. In the full open state, the fourth throttling device 34 acts as a conduit.

Referring to FIG. 1 to FIG. 7, the third path switching device 63 switches the flow direction of the refrigerant in the primary refrigerant system. Optionally, the third flow path switching device 63 may be a four-way valve or a combination of multiple valves. In this embodiment, the third flow path switching device 63 is the four-way valve. Specifically, the third flow path switching device 63 includes an eighth port 63*a*, a ninth port 63*b*, a tenth port 63*c* and an eleventh port 63*d*. The eighth port 63*a* communicates with the first port 12*a* of the second heat exchanger 12; the ninth port 63*b* communicates with an outlet of the first compressor 21; the tenth port 63*c* communicates with at least one of the second port 111*b* of the first heat exchange portion 111 and the eighth heat exchanger 18; the eleventh port 63*d* communicates with an inlet of the first compressor 21. The third path switching device 63 includes a third working state and a fourth working state. In the third working state, the eighth port 63*a* communicates with the ninth port 63*b*; the tenth port 63*c* communicates with the eleventh port 63*d*. In the fourth working state, the eighth port 63*a* communicates with the eleventh port 63*d*; the ninth port 63*b* communicates with the tenth port 63*c*.

The second heat exchanger 12 is an air-cooled heat exchanger. The refrigerant in the second heat exchanger 12 exchanges heat with environmental air. Optionally, the second heat exchanger 12 may be a micro-channel heat exchanger. In this embodiment, the second heat exchanger 12 is an outdoor heat exchanger.

In some embodiments, referring to FIG. 1 to FIG. 6, the second heat exchanger 12 may include a third sub-heat exchanger 121, a fourth sub-heat exchanger 122 and a fifth sub-heat exchanger 123. A first port 121*a* of the third sub-heat exchanger 121 is capable of communicating with the eighth port 63*a*; the first port 122*a* of the fourth sub-heat exchanger 122 is capable of communicating with the eighth port 63*a*; a second port 121*b* of the third sub-heat exchanger 121 is capable of communicating with the first port 123*a* of the fifth sub-heat exchanger 123; a second port 122*b* of the fourth sub-heat exchanger 122 is capable of communicating with a first port 123*a* of the fifth sub-heat exchanger 123; a second port 123*b* of the fifth sub-heat exchanger 123 is capable of communicating with the first throttling device 31. The first port 121*a* of the third sub-heat exchanger 121 and the first port 122*a* of the fourth sub-heat exchanger 122 are collectively referred to as the first port 12*a* of the second heat exchanger 12. The second port 123*b* of the fifth sub-heat exchanger 123 is the second port 12*b* of the second heat exchanger 12. The third sub-heat exchanger 121, the fourth sub-heat exchanger 122 and the fifth sub-heat exchanger 123 are all air-cooled heat exchangers. The refrigerant in the heat exchanger exchanges heat with the environmental air. Optionally, the third sub-heat exchanger 121, the fourth sub-heat exchanger 122 and the fifth sub-heat exchanger 123 may be micro-channel heat exchangers. The second heat exchanger 12 includes the third sub-heat exchanger 121, the fourth sub-heat exchanger 122 and the fifth sub-heat exchanger 123. This setting increases the heat exchange area for heat exchange between the refrigerant and the air, and improves the heat exchange performance of the thermal management system. In other alternative embodiments, referring to FIG. 7, the second heat exchanger 12 is a single heat exchanger. By providing the second heat exchanger 12 as the single heat exchanger, compared with the second heat exchanger 12 having multiple heat exchangers, the system structure is simpler and the cost is lower.

In other alternative embodiments, referring to FIG. 1 to FIG. 6, the primary refrigerant system further includes the gas-liquid separator 71 and the intermediate heat exchanger 81. The intermediate heat exchanger 81 includes a first heat exchange portion 811 and a second heat exchange portion 812. The first heat exchange portion 811 is communicated between the second heat exchanger 12 and the first throttling device 31. The first heat exchange portion 811 is communicated between the second heat exchanger 12 and the third throttling device 33. The gas-liquid separator 71 and the second heat exchange portion 812 are communicated between an inlet of the first compressor 21 and the eleventh port 63*d*. The refrigerant circulating in the first heat exchange portion 811 is capable of exchanging heat with the fluid refrigerant in the second heat exchange portion 812. The gas-liquid separator 71 is used to separate the liquid refrigerant and the gas refrigerant before entering the first compressor 21. In some embodiments, the gas-liquid separator 71 and the intermediate heat exchanger 81 may be two separate components. The gas-liquid separator 71 may be communicated between the second heat exchange portion 812 and the eleventh port 63*d*. Alternatively, the gas-liquid separator 71 may be communicated between the second heat exchange portion 812 and the inlet of the compressor. In other alternative embodiments, the gas-liquid separator 71 and the intermediate heat exchanger 81 may be an integrated component. In other alternative embodiments, the primary refrigerant system may not include the gas-liquid separator 71 and the intermediate heat exchanger 81. The second heat exchanger 12 can be directly communicated with the first throttling device 31 through a pipeline or other communicating elements with passages inside; and/or, the second heat exchanger 12 can be directly communicated with the third throttling device 33 through a pipeline or other communicating elements with passages inside.

Referring to FIG. 1 to FIG. 7, the thermal management system includes a battery heat exchange assembly 41. The primary coolant system includes a first pump 51, a motor heat exchange assembly 42, a fifth pump 55, a sixth heat exchanger 16 and a fourth flow path f. The motor heat exchange assembly 42, the tenth heat exchange portion 192, the sixth heat exchanger 16 and the fifth pump 55 are in communication with the fourth flow path f. The second heat exchange portion 112, the first pump 51 and the battery heat exchange assembly 41 are capable of being communicated so as to form a loop. The motor heat exchange assembly 42, the tenth heat exchange portion 192, the sixth heat exchanger 16 and the fifth pump 55 are capable of being communicated so as to form a loop.

Referring to FIG. 1 to FIG. 7, the primary coolant system includes a fourth path switching device 64. The fourth flow path switching device 64 includes a twelfth port 64*a*, a thirteenth port 64*b*, a fourteenth port 64*c* and a fifteenth port 64*d*. The twelfth port 64*a* communicates with the second heat exchange portion 112; the thirteenth port 64*b* communicates with the battery heat exchange assembly 41; the fourteenth port 64*c* communicates with one end of the fourth flow path f; and the fifteenth port 64*d* communicates with the other end of the fourth flow path f. The fourth path switching device 64 includes a fifth working state and a sixth working state. In the fifth working state, the twelfth port 64*a* communicates with the thirteenth port 64*b*; the fourteenth port 64*c* communicates with the fifteenth port 64*d*. In the sixth working state, the thirteenth port 64*b* communicates with the fourteenth port 64*c*; the fifteenth port 64*d* communicates with the sixteenth port 65*a*. That is, in the fifth working state, the components in the fourth flow path f are communicated to form a loop, while the fourth flow path f is not in communication with the flow path where the second heat exchange portion 112, the first pump 51 and the battery heat exchange assembly 41 are located. In the sixth working state, the flow path where the second heat exchange portion 112, the first pump 51 and the battery heat exchange assembly 41 are located communicates with the fourth flow path f; and the flow path where the second heat exchange portion 112, the first pump 51 and the battery heat exchange assembly 41 are located communicates with the fourth flow path f to form a loop.

Referring to FIG. 1 to FIG. 7, the primary coolant system further includes a fifth path switching device 65 and a second branch e. The fifth flow path switching device 65 includes a sixteenth port 65*a*, a seventeenth port 65*b*, and an eighteenth port 65*c*. The sixteenth port 65*a* is capable of communicating with one of the seventeenth port 65*b* and the eighteenth port 65*c*. The sixteenth port 65*a* communicates with the tenth heat exchange portion 192; the seventeenth port communicates with one end of the second branch e; the eighteenth port 65*c* communicates with the sixth heat exchanger 16; the second branch e is connected in parallel with the sixth heat exchanger 16; the other end of the second branch e communicates with the fifteenth port 64*d*; and the sixth heat exchanger 16 communicates with the fifteenth port 64*d*.

Referring to FIG. 1 to FIG. 7, the secondary system includes the secondary refrigerant system and the secondary coolant system. The secondary system includes a second compressor 22, a third heat exchanger 13, a second throttling device 32, a fourth heat exchanger 14 and a second pump 52. The third heat exchanger 13 includes a third heat exchange portion 131 and a fourth heat exchange portion 132 which are not communicated. Both the third heat exchange portion 131 and the fourth heat exchange portion 132 define flow channels. The flow channel of the third heat exchange portion 131 is used for circulating refrigerant. The flow channel of the fourth heat exchange portion 132 is used for circulating coolant. The third heat exchange portion 131 and the fourth heat exchange portion 132 are capable of performing heat exchange.

The second throttling device 32 is used to regulate the refrigerant flow rate in the primary refrigerant system. The second throttling device 32 includes a throttling state and a cut-off state. In the throttling state, the second throttling device 32 throttles the refrigerant. In the cut-off state, the second throttling device 32 cuts off the refrigerant, so that the flow path where the second throttling device 32 is located is not conducted. Optionally, the second throttling device 32 may be a two-way throttle valve. The second throttling device 32 can also be a combination of other valve elements, as long as it includes a throttling state and a cut-off state, and has a bidirectional throttling function in the throttling state.

In some embodiments, referring to FIG. 1 to FIG. 6, the thermal management system further includes a seventh heat exchanger 17. The seventh heat exchanger 17 includes a seventh heat exchange portion 171 and an eighth heat exchange portion 172. Both the seventh heat exchange portion 171 and the eighth heat exchange portion 172 define flow channels. The flow channel of the seventh heat exchange portion 171 is used to communicate with the coolant. The seventh heat exchange portion 171 can be communicated between the sixth heat exchanger 16 and the fourth path switching device 64 which are disposed in the primary coolant system. The eighth heat exchange portion 172 is capable of communicating with the secondary refrigerant system. In some embodiments, referring to FIG. 1 to FIG. 6, the fourth heat exchanger 14 includes a fifth heat exchange portion 141 and a sixth heat exchange portion 142. Both the fifth heat exchange portion 141 and the sixth heat exchange portion 142 define flow channels. The fifth heat exchange portion 141 is capable of communicating with the secondary refrigerant system; the sixth heat exchange portion 142 is capable of communicating with the secondary coolant system. The fourth heat exchanger 14 is a water-cooled heat exchanger. In the secondary refrigerant system, an outlet of the second compressor 22 is capable of communicating with the first port 172*a* of the eighth heat exchange portion 172; the second port 172*b* of the eighth heat exchange portion 172 is capable of communicating with a first port 141*a* of the fifth heat exchange portion 141; the second port 141*b* of the fifth heat exchange portion 141 is capable of communicating with a first port 32*a* of the second throttling device 32; the second port 32*b* of the second throttling device 32 is capable of communicating with the first port 131*a* of the third heat exchange portion 131; the second port 131*b* of the third heat exchange portion 131 is capable of communicating with an inlet of the second compressor 22.

In other alternative embodiments, the thermal management system may not include the seventh heat exchanger 17. In the primary coolant system, the seventh heat exchange portion 171 is not communicated between the sixth heat exchanger 16 and the fourth path switching device 64. In the secondary refrigerant system, the eighth heat exchange portion 172 is not communicated between the second compressor 22 and the fourth heat exchanger 14.

Figure 6:
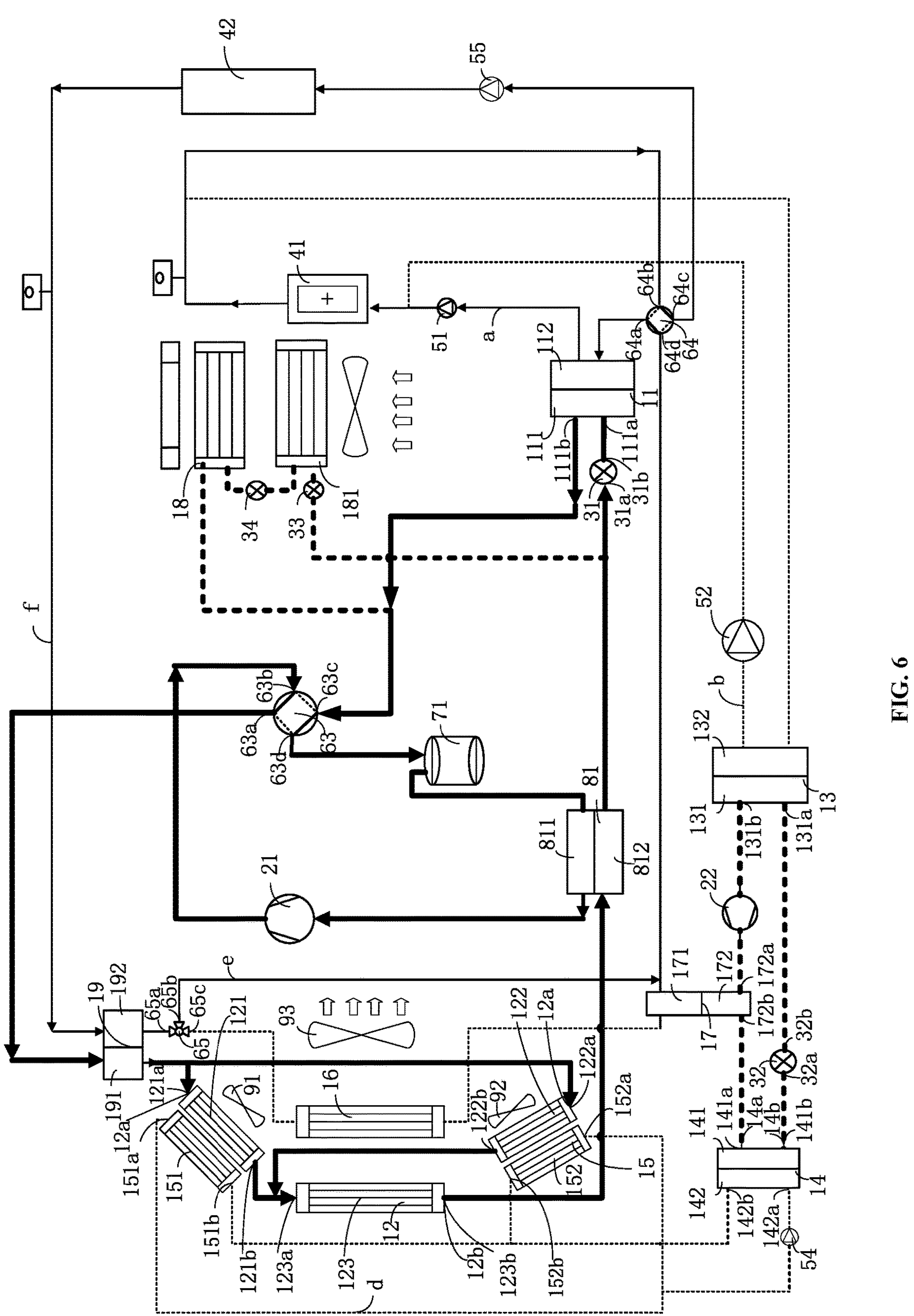
FIG. 6 is a schematic diagram of a working principle of a defrosting mode in an embodiment of the thermal management system of the present disclosure.
Figure 7:
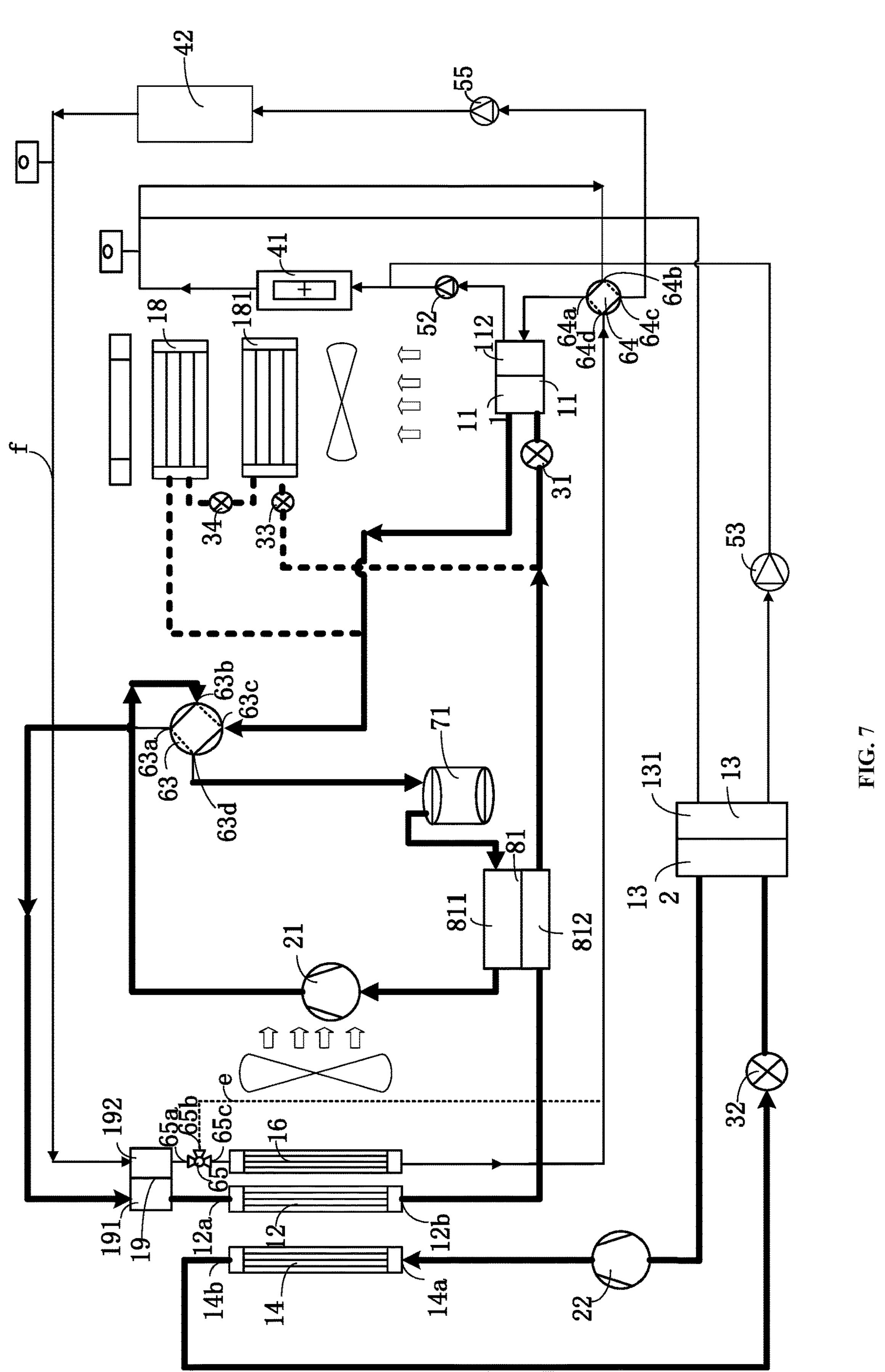
FIG. 7 is a schematic diagram of the working principle of the battery rapid heat dissipation mode in another embodiment of the thermal management system of the present disclosure.

In other alternative embodiments, referring to FIG. 7, the fourth heat exchanger 14 is an air-cooled heat exchanger. The inlet of the first compressor 21 is capable of communicating with a first port 14*a* of the fourth heat exchanger 14; a second port 14*b* of the fourth heat exchanger 14 is capable of communicating with the first port 32*a* (see FIG. 6, for example) of the second throttling device 32. Optionally, the fourth heat exchanger 14 is a micro-channel heat exchanger. The refrigerant in the fourth heat exchanger 14 exchanges heat with the environmental air. When the fourth heat exchanger 14 is a water-cooled heat exchanger, the first port 14*a* of the fourth heat exchanger 14 is the first port 141*a* of the fourth heat exchange portion 132; the second port 14*b* of the fourth heat exchanger 14 is the second port 141*b* of the fourth heat exchange portion 132.

In some embodiments, as shown in FIG. 1 to FIG. 6, the secondary coolant system includes a second flow path b, a third flow path d, a fifth heat exchanger 15, the second pump 52 and a fourth pump 54. The fifth heat exchanger 15 communicates with the fourth pump 54 in the third flow path d; the fourth heat exchange portion 132 communicates with the second pump 52 in the second flow path b; the second flow path b is capable of communicating with the battery heat exchange assembly 41 to form a loop; the second flow path b does not communicate with the third flow path d. In some embodiments, the fifth heat exchanger 15 includes a first sub-heat exchanger 151 and a second sub-heat exchanger 152. A first port 151*a* of the first sub-heat exchanger 151 is capable of communicating with a first port 142*a* of the sixth heat exchange portion 142; a first port 152*a* of the second sub-heat exchanger 152 communicates with the first port 142*a* of the sixth heat exchange portion 142; a second port 151*b* of the first sub-heat exchanger 151 communicates with a second port 142*b* of the sixth heat exchange portion 142; a second port 152*b* of the second sub-heat exchanger 152 communicates with the second port 142*b* of the sixth heat exchange portion 142; the first sub-heat exchanger 151 is connected in parallel with the second sub-heat exchanger 152. The arrangement of the fifth heat exchanger 15 including the first sub-heat exchanger 151 and the second sub-heat exchanger 152 can improve the heat exchange performance of the fifth heat exchanger 15. In other embodiments, the fifth heat exchanger 15 is a single heat exchanger. The arrangement of the fifth heat exchanger 15 as the single heat exchanger has a simpler system structure Referring to FIG. 1 to FIG. 6, the primary coolant system includes a first flow path a and the first pump 51. The first pump 51 communicates with the second heat exchange portion 112 in the first flow path a; and the first flow path a is capable of communicating with the battery heat exchange assembly 41 to form a loop. The secondary coolant system includes a second flow path b and the second pump 52. The second pump 52 communicates with the fourth heat exchange portion 132 in the second flow path b; the battery heat exchange assembly 41 is capable of communicating with the second flow path b to form a loop. The first flow path a and the second flow path b are connected in parallel.

The battery heat exchange assembly 41 is capable of communicating with the second heat exchange portion 112; and the battery heat exchange assembly 41 is capable of communicating with the fourth heat exchange portion 132. The battery is capable of exchanging heat with the coolant flowing through the second heat exchange portion 112, and can also perform heat exchange with the coolant flowing through the fourth heat exchange portion 132, thereby increasing the way to adjust the temperature of the battery.

The thermal management system includes the primary system and the secondary system. Under normal working conditions, the secondary system is not working, and the primary system has sufficient thermal management capacity. In some special working conditions, the primary system and the secondary system work together. Therefore, the secondary system should be miniaturized as much as possible. The secondary system can be designed with a highly integrated module group to improve the integration of the secondary system and facilitate the miniaturization of the secondary system. In addition, the refrigerant in the primary refrigerant system is CO2. The refrigerant of the secondary refrigerant system is R134A.

Figure 11:
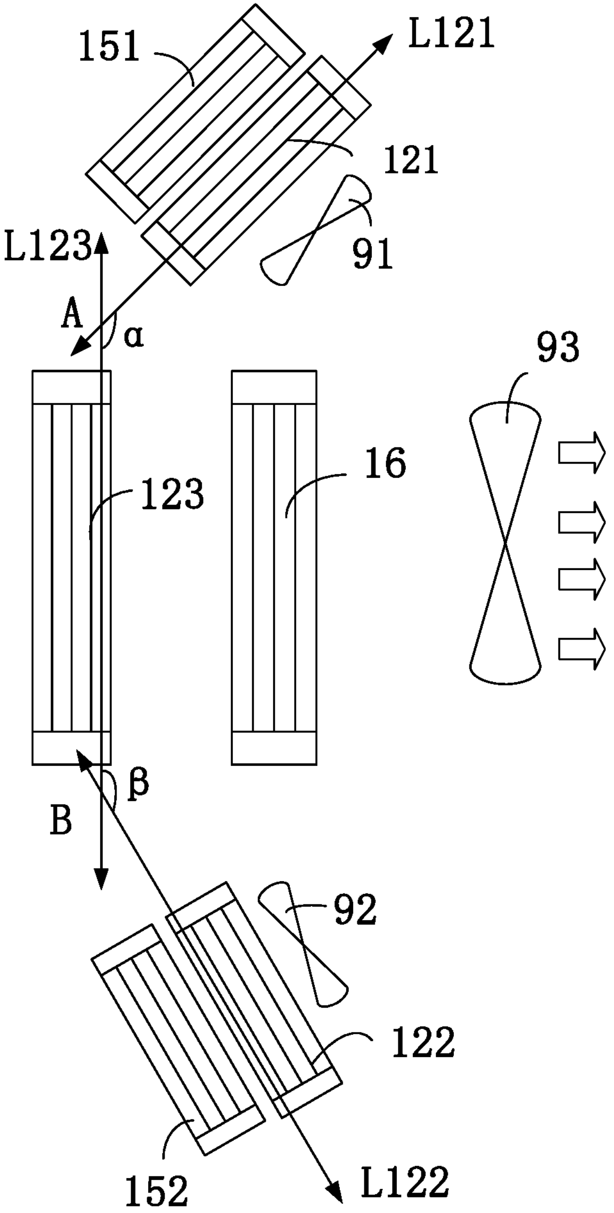
FIG. 11 is a schematic diagram of positions of first, second, third, fourth, fifth sub-heat exchangers and a sixth heat exchanger shown in FIG. 1.

Referring to FIG. 1 to FIG. 6, when the thermal management system of the present disclosure is used in an electric vehicle, the third sub-heat exchanger 121, the fourth sub-heat exchanger 122, the fifth sub-heat exchanger 123, the first sub-heat exchanger 151, the second sub-heat exchanger 152 and the sixth heat exchanger 16 are located at a front end of the vehicle head. Moreover, the front of the vehicle has a vent, so that the third sub-heat exchanger 121, the fourth sub-heat exchanger 122, the fifth sub-heat exchanger 123, the first sub-heat exchanger 151, the second sub-heat exchanger 152 and the sixth sub-heat exchanger 16 are capable of exchanging heat with the air. A length direction of the fifth sub-heat exchanger 123 is substantially parallel to a width direction of the vehicle; the third sub-heat exchanger 121 and the fourth sub-heat exchanger 122 are respectively located on opposite sides of the fifth sub-heat exchanger 123 in the length direction. Referring to FIG. 11, a length direction L121 of the third sub-heat exchanger 121 intersects a length direction L123 of the fifth sub-heat exchanger 123 at a first point A; the third sub-heat exchanger 121 is rotated around the first point A by a first angle $\alpha$ relative to the fifth sub-heat exchanger 123; A length direction L122 of the fourth sub-heat exchanger 122 intersects the length direction L123 of the fifth sub-heat exchanger 123 at a second point B; the fourth sub-heat exchanger 122 is rotated around the second point B by a second angle $\beta$ relative to the fifth sub-heat exchanger 123; both the first angle $\alpha$ and the second angle $\beta$ are obtuse angles.

The first sub-heat exchanger 151 and the second sub-heat exchanger 152 are respectively located on opposite sides of the fifth sub-heat exchanger 123 in the length direction. The sixth heat exchanger 16 is located between the first sub-heat exchanger 151 and the second sub-heat exchanger 152. A length direction of the sixth heat exchanger 16 is parallel to a length direction of the fifth heat exchanger 15. A length direction of the first sub-heat exchanger 151 is parallel to a length direction of the third sub-heat exchanger 121. A length direction of the second sub-heat exchanger 152 is parallel to a length direction of the fourth sub-heat exchanger 122.

The thermal management system further includes a first air supply device 91, a second air supply device 92 and a third air supply device 93. The first air supply device 91, the third sub-heat exchanger 121 and the first sub-heat exchanger 151 are disposed side by side. The second air supply device 92, the fourth sub-heat exchanger 122 and the second sub-heat exchanger 152 are disposed side by side. The third air supply device 93, the fifth sub-heat exchanger 123 and the sixth heat exchanger 16 are disposed side by side.

The third sub-heat exchanger 121, the fifth sub-heat exchanger 123 and the fourth sub-heat exchanger 122 are roughly arranged in a C shape. The first sub-heat exchanger 151, the second sub-heat exchanger 152 and the fifth sub-heat exchanger 123 are roughly arranged in a C shape. The first air supply device 91, the third sub-heat exchanger 121 and the first sub-heat exchanger 151 are disposed side by side; the second air supply device 92, the fourth sub-heat exchanger 122 and the second sub-heat exchanger 152 are disposed side by side; the third air supply device 93, the fifth sub-heat exchanger 123 and the sixth heat exchanger 16 are disposed side by side. As a result, the side space at the front end of the vehicle is fully utilized, the heat exchange area between the heat exchanger and the environmental air is increased, and the heat exchange performance of the thermal management system is improved.

The air sent by the first air supply device 91 can pass through the first sub-heat exchanger 151 and the third sub-heat exchanger 121. The air sent by the second air supply device 92 can pass through the second sub-heat exchanger 152 and the fourth sub-heat exchanger 122. The air sent by the third air supply device 93 can pass through the fifth sub-heat exchanger 123 and the sixth heat exchanger 16. Optionally, the air supply device is a fan. The fan can be a blower or a suction fan. In this embodiment, the air supply device adopts the suction fan. Along an air supply direction of the first air supply device 91, the third sub-heat exchanger 121 is located in front of the first sub-heat exchanger 151; and the third sub-heat exchanger 121 is located between the first sub-heat exchanger 151 and the first air supply device 91. Along an air supply direction of the second air supply device 92, the fourth sub-heat exchanger 122 is located in front of the second sub-heat exchanger 152; and the fourth sub-heat exchanger 122 is located between the second sub-heat exchanger 152 and the second air supply device 92. Along an air supply direction of the third air supply device 93, the sixth heat exchanger 16 is located in front of the fifth sub-heat exchanger 123. The sixth heat exchanger 16 is located between the fifth sub-heat exchanger 123 and the third air supply device 93. The air from the first air supply device 91 first passes through the first sub-heat exchanger 151, and then passes through the third sub-heat exchanger 121. The air from the second air supply device 92 first passes through the second sub-heat exchanger 152, and then passes through the fourth sub-heat exchanger 122. The air from the third air supply device 93 first passes through the fifth sub-heat exchanger 123, and then passes through the sixth heat exchanger 16.

The air supply direction of the first air supply device 91 is perpendicular to the length direction of the third sub-heat exchanger 121. The air supply direction of the second air supply device 92 is perpendicular to the length direction of the fourth sub-heat exchanger 122. The air supply direction of the third air supply device 93 is perpendicular to the length direction of the fifth sub-heat exchanger 123. In other alternative embodiments, along the air supply direction of the first air supply device 91, the third sub-heat exchanger 121 may be located behind the first sub-heat exchanger 151. Along the air supply direction of the second air supply device 92, the fourth sub-heat exchanger 122 may be located behind the second sub-heat exchanger 152.

The thermal management system has multiple working modes, including a rapid battery heat dissipation mode, a cooling mode, a heating mode, a heating and dehumidification mode, and a defrosting mode etc. In different operating modes, the second heat exchanger 12 can be used as an evaporator or a condenser. The eighth heat exchanger 18 and the ninth heat exchanger 181 is capable of exchanging heat with the air entering an air-conditioning box of the passenger compartment. The eighth heat exchanger 18 and the ninth heat exchanger 181 are arranged in the air-conditioning box. A blower can further be arranged in the air-conditioning box to transport air. Referring to FIG. 1 to FIG. 10, thick solid lines are the flow paths of the refrigerant; thin solid lines are the flow paths of the coolant; dotted lines indicate that in this mode, these sections of the flow paths are not conducted.

The thermal management system of this embodiment is not only applicable to vehicles, but also applicable to other heat exchange systems requiring thermal management. For ease of description, the description of the present disclosure takes the vehicle as an example for illustration.

When the battery in the vehicle needs to cool down quickly, such as when a pure electric vehicle is parked and fast-charged in summer, the battery generates huge heat, in order to ensure the safety of the battery, the thermal management system needs to dissipate the heat generated by the battery quickly, and the thermal management system can start the battery rapid heat dissipation mode. Referring to FIG. 1, in the battery rapid heat dissipation mode, the first throttling device 31 is in the throttling state; the second throttling device 32 is in the throttling state; the third throttling device 33 is in the cut-off state; the third flow path switching device 63 is in the third working state; the fourth flow path switching device 64 is in the fifth working state; the sixteenth port 65*a* of the fifth path switching device 65 communicates with the eighteenth port 65*c*; the sixteenth port 65*a* is not in communication with the seventeenth port 65*b*; the first pump 51 is turned on; the second pump 52 is turned on; the fourth pump 54 is turned on; and the fifth pump is turned on.

The circulation path of the primary refrigerant system is as follows: the outlet of the first compressor 21 communicates with the ninth port 63*b*; the ninth port 63*b* communicates with the eighth port 63*a*; the eighth port 63*a* communicates with the ninth heat exchange portion 191; the ninth heat exchange portion 191 communicates with the first port 121*a* of the third sub-heat exchanger 121; the ninth heat exchange portion 191 communicates with the first port 122*a* of the fourth sub-heat exchanger 122; the second port 121*b* of the third sub-heat exchanger 121 communicates with the first port 123*a* of the fifth sub-heat exchanger 123; the second port 122*b* of the fourth sub-heat exchanger 122 communicates with the first port 123*a* of the fifth sub-heat exchanger 123; the second port 123*b* of the fifth sub-heat exchanger 123 communicates with the second heat exchange portion 812; the second heat exchange portion 812 communicates with the first port 31*a* of the first throttling device 31; the second port 31*b* of the first throttling device 31 communicates with the first port 111*a* of the first heat exchange portion 111; the second port 111*b* of the first heat exchange portion 111 communicates with the tenth port 63*c*; the tenth port 63*c* communicates with the eleventh port 63*d*; the eleventh port 63*d* communicates with the gas-liquid separator 71; the gas-liquid separator 71 communicates with the first heat exchange portion 811; and the first heat exchange portion 811 communicates with the inlet of the first compressor 22. The circulation path of the primary coolant system is as follows: the first pump 51 communicates with the battery heat exchange assembly 41; the battery heat exchange assembly 41 communicates with the thirteenth port 64*b*; the thirteenth port 64*b* communicates with the twelfth port 64*a*; the twelfth port 64*a* communicates with the second heat exchange portion 112; and the second heat exchange portion 112 communicates with the first pump 51. The motor heat exchange assembly 42, the fifth pump 55, the seventh heat exchange portion 171, the sixth heat exchanger 16 communicate with the tenth heat exchange portion 192 to form a loop. One end of the fourth flow path f communicates with the fourteenth port 64*c*; the other end of the fourth flow path f communicates with the fifteenth port 64*d*; the fourth flow path f is not in communication with the flow path where the battery heat exchange assembly 41 is located.

The circulation path of the secondary refrigerant system is as follows: the outlet of the second compressor 22 communicates with the first port 172*a* of the eighth heat exchange portion 172; the second port 172*b* of the eighth heat exchange portion 172 communicates with the first port 141*a* of the fifth heat exchange portion 141; the second port 141*b* of the fifth heat exchange portion 141 communicates with the first port 32*a* of the second throttling device 32; the second port 32*b* of the second throttling device 32 communicates with the third heat exchange portion 131; and the third heat exchange portion 131 communicates with the inlet of the second compressor 22. The circulation path of the secondary coolant system is as follows: the fourth heat exchange portion 132, the second pump 52 and the battery heat exchange assembly 41 are communicated to form a loop; the first port 142*a* of the sixth heat exchange portion 142 communicates with the first port 151*a* of the first sub-heat exchanger 151; the first port 142*a* of the sixth heat exchange portion 142 communicates with the first port 152*a* of the second sub-heat exchanger 152; the second port 151*b* of the first sub-heat exchanger 151 communicates with the second port 142*b* of the sixth heat exchange portion 142; and the second port 152*b* of the second sub-heat exchanger 152 communicates with the second port 142*b* of the sixth heat exchange portion 142.

In the battery rapid heat dissipation mode, in the primary system, the third sub-heat exchanger 121, the fourth sub-heat exchanger 122 and the fifth sub-heat exchanger 123 are condensers; and the first heat exchanger 11 is an evaporator. In the secondary system, the third heat exchanger 13 is an evaporator; and the fourth heat exchanger 14 is a condenser. The refrigerant circulating in the first heat exchanging portion 111 can absorb the heat of the coolant circulating in the second heat exchanging portion 112; the refrigerant circulating in the third heat exchange portion 131 can absorb the heat of the coolant circulating in the fourth heat exchange portion 132; the battery heat exchange assembly 41 communicates with both the second heat exchange portion 112 and the fourth heat exchange portion 132, so that the battery is capable of exchanging heat with the coolant in the primary and secondary coolant systems at the same time. That is, the first heat exchanging portion 111 and the third heat exchanging portion 131 can absorb the heat of the battery at the same time, so that the heat of the battery can be quickly dissipated.

When there is a cooling demand in the passenger compartment, the thermal management system can start the cooling mode. The cooling mode includes a first cooling mode and a second cooling mode. When both the passenger compartment and the battery have cooling requirements, and the primary system is sufficient to meet the cooling requirements of the battery, the thermal management system can start the first cooling mode. When both the passenger compartment and the battery have a cooling requirement, the battery has a rapid cooling requirement, and the primary system cannot meet the cooling requirement of the battery, the thermal management system can start the second cooling mode.

Figure 2:
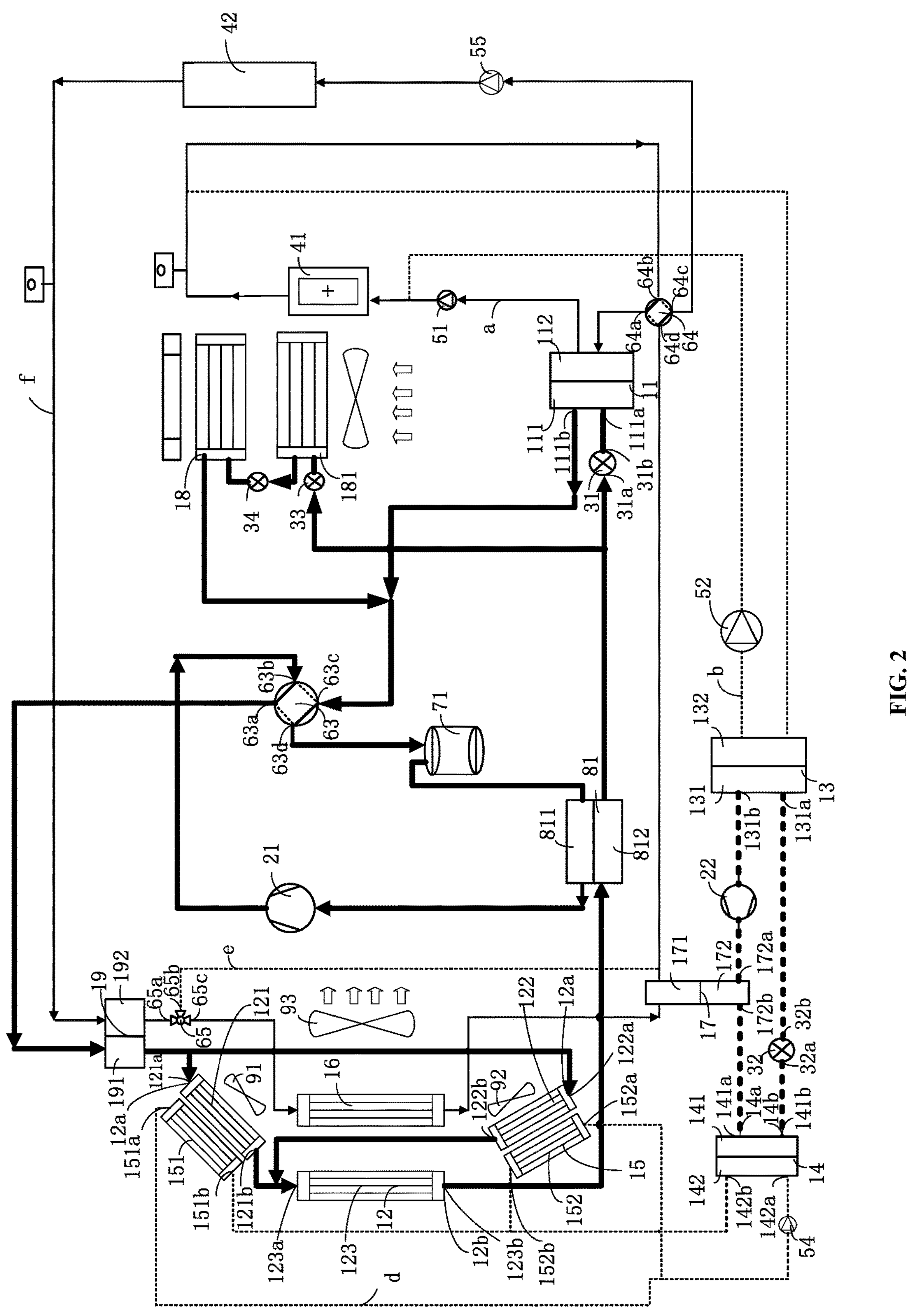
FIG. 2 is a schematic diagram of a working principle of a first cooling mode in an embodiment of the thermal management system of the present disclosure.

Referring to FIG. 2, in the first cooling mode, the first throttling device 31 is in the throttling state; the third throttling device 33 is in the throttling state; the fourth throttling device 34 is in a fully open state; the third flow path switching device 63 is in the third working state; the fourth flow path switching device 64 is in the fifth working state; the sixteenth port 65*a* of the fifth path switching device 65 communicates with the eighteenth port 65*c* of the fifth path switching device 65; the sixteenth port 65*a* is not in communication with the seventeenth port 65*b*; the first pump 51 is turned on; the fifth pump 55 is turned on; the second compressor 22 is in a non-working state. The differences between the first cooling mode and the battery rapid heat dissipation mode are that in the first cooling mode, the second compressor 22 is in the non-working state, and the secondary system does not circulate; in the primary refrigerant system, the second heat exchange portion 812 communicates with the first port 31*a* of the first throttling device 31, and the second heat exchange portion 812 communicates with the third throttling device 33. That is, the refrigerant flowing out from the second heat exchange portion 812 is divided into two paths, in which one path flows to the first throttling device 31 and the first heat exchanging portion 111 in turn, and the other path flows to the third throttling device 33, the ninth heat exchanger 181, the fourth throttling device 34 and the eighth heat exchanger 18 in turn. The refrigerant flowing out of the first heat exchange portion 111 merges with the refrigerant flowing out of the eighth heat exchanger 18, and then flows to the tenth port 63*c* together. The communication of other components in the first cooling mode is the same as that in the battery rapid heat dissipation mode, and reference may be made to related descriptions.

In the first cooling mode, the third sub-heat exchanger 121, the fourth sub-heat exchanger 122 and the fifth sub-heat exchanger 123 are condensers; the first heat exchanger 11, the ninth heat exchanger 181 and the eighth heat exchanger 18 are evaporators. The secondary system does not operate. The ninth heat exchanger 181 and the eighth heat exchanger 18 absorb the heat of the air in the passenger compartment to achieve cooling effect. The refrigerant in the first heat exchange portion 111 can absorb the heat of the coolant circulating in the second heat exchange portion 112; the second heat exchanging portion 112 communicates with the battery heat exchanging assembly 41, so that the heat of the battery can be dissipated through the coolant circulating in the second heat exchanging portion 112.

Figure 3:
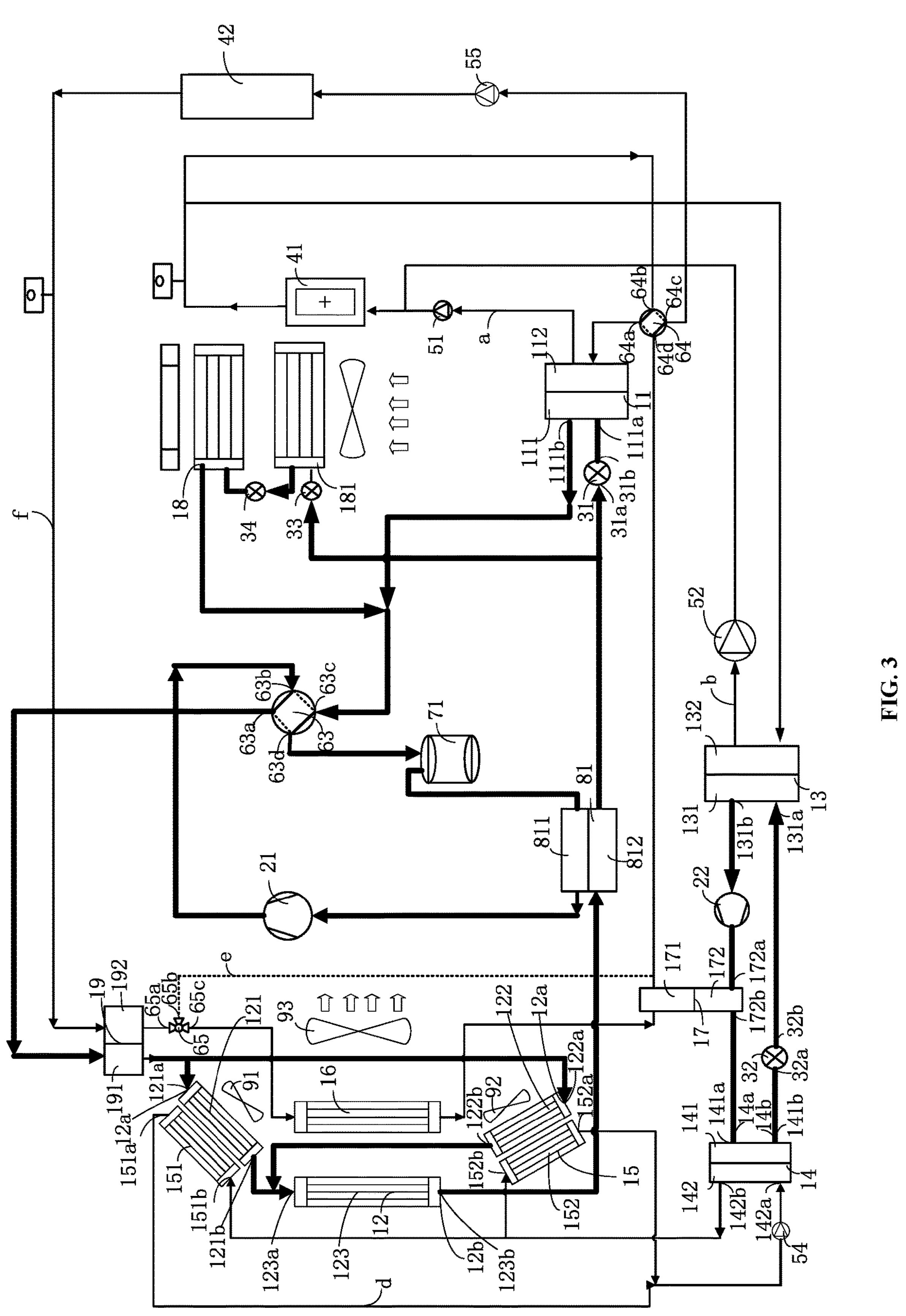
FIG. 3 is a schematic diagram of a working principle of a second cooling mode in an embodiment of the thermal management system of the present disclosure.

The differences between the second cooling mode and the first cooling mode are that, in the second cooling mode, the second compressor 22 is in the working state. Referring to FIG. 3, in the second cooling mode, the working principle of the primary system in the second cooling mode and the primary system in the first cooling mode, and the communication relationship of each component are the same. The working principle of the secondary system in the second cooling mode and the secondary system in the battery rapid heat dissipation mode, and the communication relationship of each component are the same.

In the second cooling mode, the third sub-heat exchanger 121, the fourth sub-heat exchanger 122 and the fifth sub-heat exchanger 123 are condensers; the first heat exchanger 11, the ninth heat exchanger 181 and the eighth heat exchanger 18 are evaporators. The ninth heat exchanger 181 and the eighth heat exchanger 18 absorb the heat of the air in the passenger compartment to achieve the cooling effect. In the secondary system, the third heat exchanger 13 is an evaporator, and the fourth heat exchanger 14 is a condenser. The refrigerant circulating in the first heat exchanging portion 111 can absorb the heat of the coolant circulating in the second heat exchanging portion 112. The refrigerant circulating in the third heat exchange portion 131 can absorb the heat of the coolant circulating in the fourth heat exchange portion 132. The battery heat exchange assembly 41 communicates with the second heat exchange portion 112 and communicates with the fourth heat exchange portion 132, so that the battery is capable of exchanging heat with the coolant in the primary and secondary coolant systems at the same time. That is, the first heat exchange portion 111 and the third heat exchange portion 131 can absorb the heat of the battery at the same time, so that the heat of the battery can be quickly dissipated.

Figure 4:
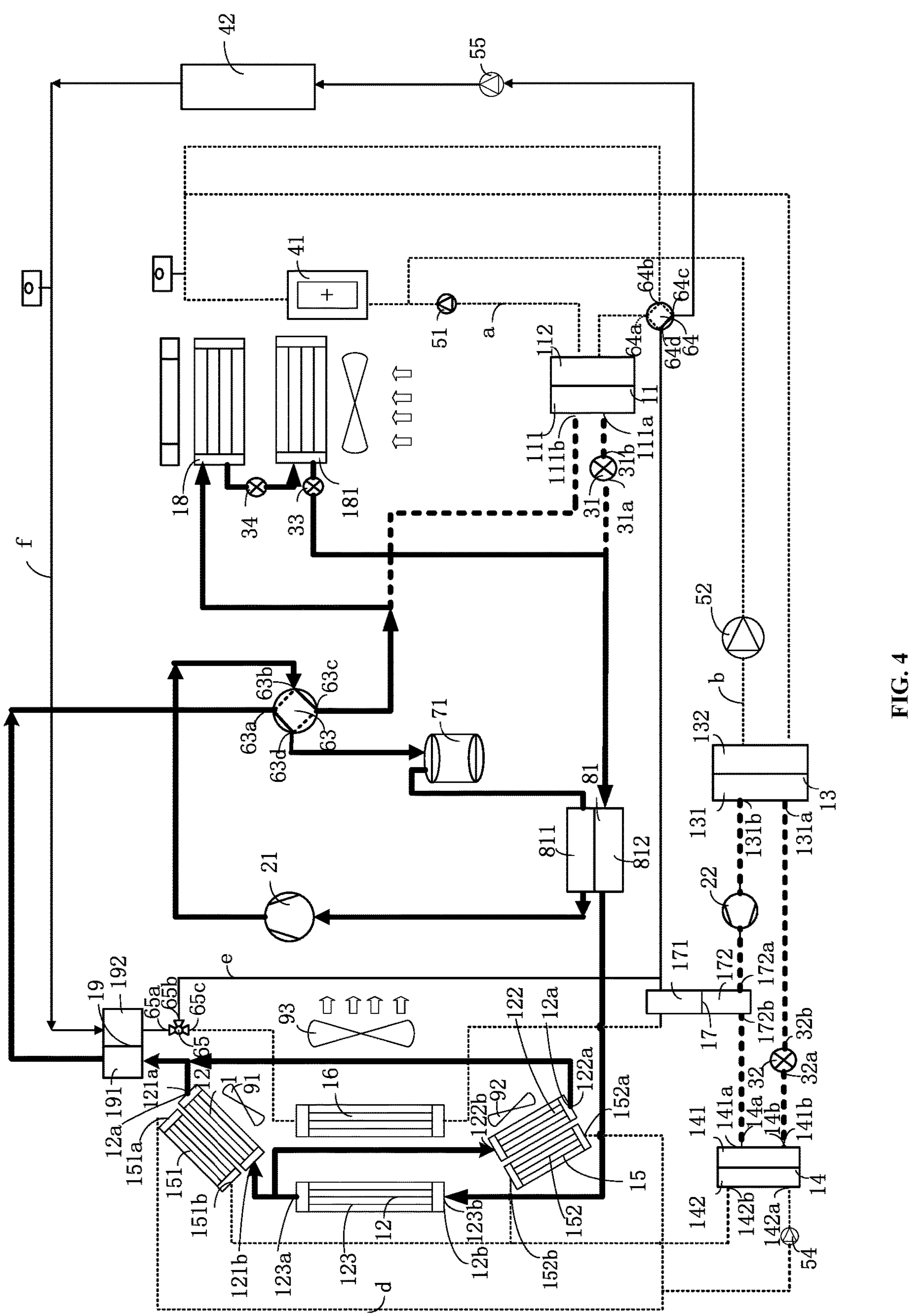
FIG. 4 is a schematic diagram of a working principle of a heating mode in an embodiment of the thermal management system of the present disclosure.

When there is a heating demand in the passenger compartment, the thermal management system can activate the heating mode. Referring to FIG. 4, in the heating mode, the first throttling device 31 is in the cut-off state; the third throttling device 33 is in the throttling state; the fourth throttling device 34 is in a fully open state; the third flow path switching device 63 is in the fourth working state; the sixteenth port 65*a* of the fifth path switching device 65 communicates with the seventeenth port 65*b* of the fifth path switching device 65; the sixteenth port 65*a* is not in communication with the eighteenth port 65*c*; the first pump 51 is turned off; the second pump 52 is turned off; the fourth pump 54 is turned off; the fifth pump 55 is turned on.

The circulation path of the primary refrigerant is as follows: the outlet of the first compressor 21 communicates with the ninth port 63*b*; the tenth port 63*c* communicates with the eighth heat exchanger 18; the eighth heat exchanger 18 communicates with the fourth throttling device 34; the fourth throttling device 34 communicates with the ninth heat exchanger 181; the ninth heat exchanger 181 communicates with the second heat exchange portion 812; the second heat exchange portion 812 communicates with the second port 123*b* of the fifth sub-heat exchanger 123; the first port 123*a* of the fifth sub-heat exchanger 123 communicates with the second port 121*b* of the third sub-heat exchanger 121; the first port 123*a* of the fifth sub-heat exchanger 123 communicates with the second port 122*b* of the fourth sub-heat exchanger 122; the second port 121*b* of the third sub-heat exchanger 121 communicates with the ninth heat exchange portion 191; the second port 122*b* of the fourth sub-heat exchanger 122 communicates with the ninth heat exchange portion 191; the ninth heat exchange portion 191 communicates with the eighth port 63*a*; the eighth port 63*a* communicates with the eleventh port 63*d*; the eleventh port 63*d* communicates with the gas-liquid separator 71; the gas-liquid separator 71 communicates with the first heat exchange portion 811; and the first heat exchange portion 811 communicates with the inlet of the first compressor 22. The circulation path of the primary coolant system is as follows: the motor heat exchange assembly 42, the tenth heat exchange portion 192, the second branch e communicate with the fifth pump 55 to form a loop; the second compressor 22 is in the non-working state; and the secondary system is not in operation.

In the heating mode, the third sub-heat exchanger 121, the fourth sub-heat exchanger 122 and the fifth sub-heat exchanger 123 are evaporators; the eighth heat exchanger 18 and the ninth heat exchanger 181 are condensers. The ninth heat exchanger 181 and the eighth heat exchanger 18 release heat into the passenger compartment to achieve the heating effect.

Figure 5:
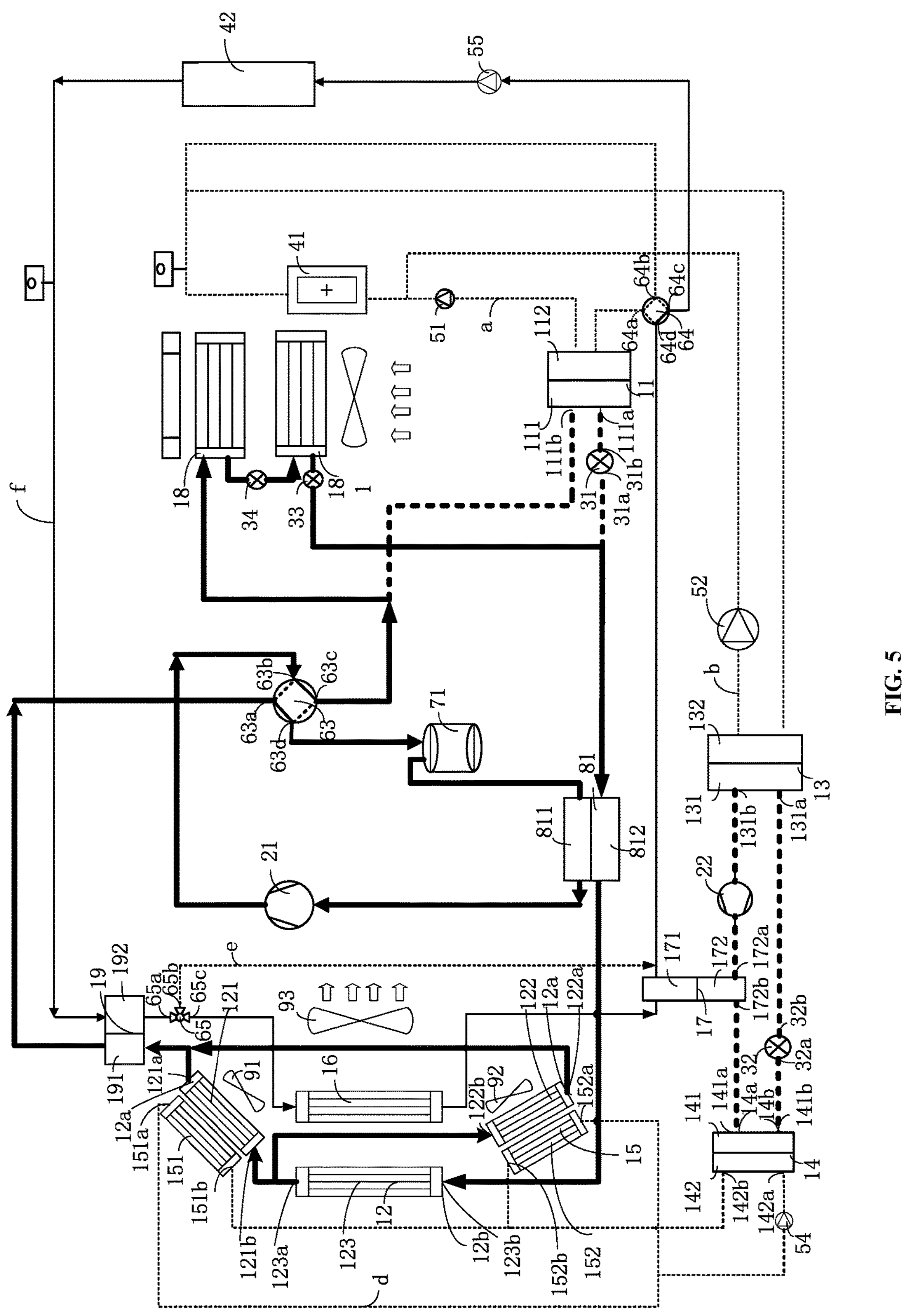
FIG. 5 is a schematic diagram of a working principle of a heating and dehumidification mode in an embodiment of the thermal management system of the present disclosure.

When the environmental temperature is low in winter and the temperature in the passenger compartment is high, the temperature in the passenger compartment differs greatly from the environmental temperature outside the vehicle, therefore water mist or water droplets will condense on the windows, which will affect the line of sight and pose a safety hazard when driving. The thermal management system of this embodiment has a heating and dehumidification mode. Referring to FIG. 5, the communication relationship of the components in the primary refrigerant system in the heating and dehumidification mode is the same as that in the heating mode. The differences between the heating and dehumidification mode and the heating mode are that, in the heating and dehumidification mode, the third throttling device 33 is in a fully open state; the fourth throttling device 34 is in the throttling state; the sixteenth port 65*a* of the fifth path switching device 65 communicates with the eighteenth port 65*c* of the fifth path switching device 65; the sixteenth port 65*a* is not in communication with the seventeenth port 65*b*. In the heating and dehumidification mode, the first throttling device 31 is in the cut-off state; the third throttling device 33 is in a fully open state; the fourth throttling device 34 is in the throttling state; the third flow path switching device 63 is in the fourth working state; the sixteenth port 65*a* of the fifth path switching device 65 communicates with the eighteenth port 65*c* of the fifth path switching device 65; the sixteenth port 65*a* is not in communication with the seventeenth port 65*b*. The circulation path of the primary coolant system is as follows: the motor heat exchange assembly 42, the tenth heat exchange portion 192, the sixth heat exchanger 16, the seventh heat exchange portion 171 communicate with the fifth pump 55 to form a loop; the second compressor 22 is in the non-working state; and the secondary system is not in operation.

In the heating and dehumidification mode, the eighth heat exchanger 18 is a condenser; the third sub-heat exchanger 121, the fourth sub-heat exchanger 122, the fifth sub-heat exchanger 123 and the ninth heat exchanger 181 are evaporators. The air in the passenger compartment passes through the ninth heat exchanger 181 first, and the refrigerant in the ninth heat exchanger 181 absorbs the heat of the air in the passenger compartment. Moisture in the air in the air-conditioning box of the passenger compartment is condensed into water droplets in the air-conditioning box and then discharged, thereby reducing the humidity of the air entering the passenger compartment. Thereafter, the air in the passenger compartment with reduced humidity passes through the eighth heat exchanger 18 as the condenser to dissipate. The refrigerant in the eighth heat exchanger 18 releases heat to the air in the passenger compartment, so that the temperature of the air passing through the eighth heat exchanger 18 is raised, so as to achieve the effect of heating and dehumidification in winter.

When the environmental temperature is low in winter and the thermal management system is in the heating mode for a long time, the third sub-heat exchanger 121, the fourth sub-heat exchanger 122 and the fifth sub-heat exchanger 123 functioning as evaporators will generate frost. At this time, the thermal management system can initiate a defrosting mode. Referring to FIG. 6, in the defrosting mode, the first throttling device 31 is in the throttling state; the third throttling device 33 is in the cut-off state; the third flow path switching device 63 is in the third working state; the fourth flow path switching device 64 is in the sixth working state; the sixteenth port 65*a* of the fifth path switching device 65 communicates with the seventeenth port 65*b*; the sixteenth port 65*a* is not in communication with the eighteenth port 65*c*; the first pump 51 is turned on; the second pump 52 is turned off; the fourth pump 54 is turned off; the fifth pump 55 is turned on; the second compressor 22 is in the non-working state; and the secondary system is not in operation. In the primary coolant system, the motor heat exchange assembly 42, the tenth heat exchange portion 192, the second branch e, the second heat exchange portion 112, the fifth pump 55 and the battery heat exchange assembly 41 are communicated in sequence to form a loop.

In the defrosting mode, the third sub-heat exchanger 121, the fourth sub-heat exchanger 122 and the fifth sub-heat exchanger 123 function as condensers; the first heat exchanger 11 functions as an evaporator; the first heat exchange portion 111 and the second heat exchange portion 112 can perform heat exchange; the refrigerant in the third sub-heat exchanger 121, the fourth sub-heat exchanger 122 and the fifth sub-heat exchanger 123 can release heat into the air, so as to facilitate the defrosting of the third sub-heat exchanger 121, the fourth sub-heat exchanger 122 and the fifth sub-heat exchanger 123. Since the motor heat exchange assembly 42 and the battery heat exchange assembly 41 communicate with the second heat exchange portion 112 to form a loop, the refrigerant circulating in the first heat exchange portion 111 can absorb the heat of the motor heat exchange assembly 42 and the battery heat exchange assembly 41, so that the heat of the motor heat exchange assembly 42 and the battery heat exchange assembly 41 can be recycled.

Figure 8:
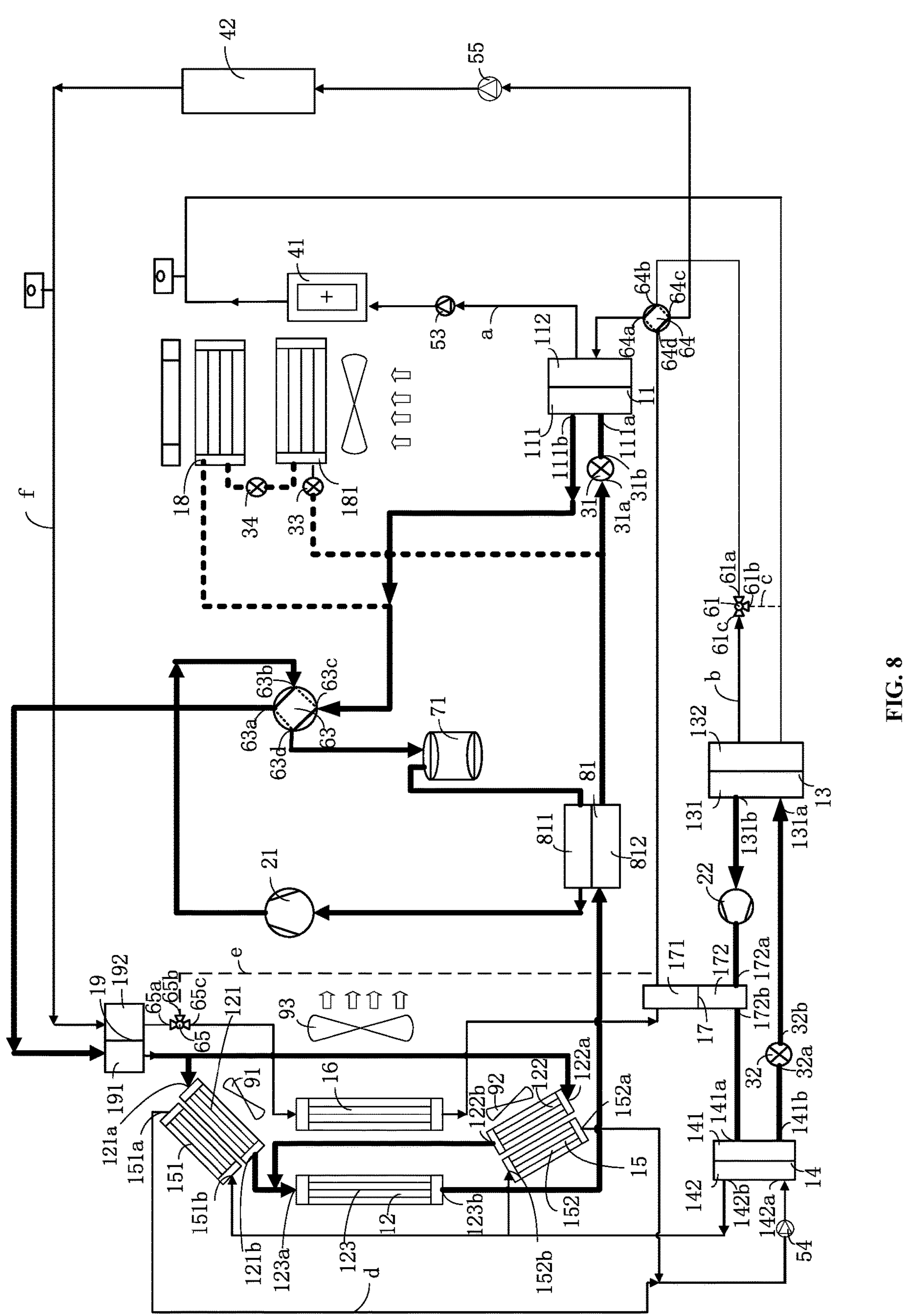
FIG. 8 is a schematic diagram of the working principle of the battery rapid heat dissipation mode in yet another embodiment of the thermal management system of the present disclosure.

According to another specific embodiment of the thermal management system of the present disclosure, as shown in FIG. 8, its structure is substantially the same as that of the above-mentioned embodiment, and its working principle is also substantially the same as that of the above-mentioned embodiment. The differences are that, the thermal management system includes a third pump 53. The third pump 53, the battery heat exchange assembly 41, the fourth heat exchange portion 132 and the second heat exchange portion 112 can be communicated in sequence to form a loop; the thermal management system includes a first branch c connected in parallel with the fourth heat exchange portion 132; the battery heat exchange assembly 41, the second heat exchange portion 112, the third pump 53 and the first branch c can communicate to form a loop; the heat management system includes a first path switching device 61 having a first port 61*a*, a second port 61*b* and a third port 61*c*. The first port 61*a* communicates with the fourth heat exchange portion 132; the second port 61*b* communicates with the first branch c; the third port 61*c* communicates with the battery heat exchange assembly 41; the first path switching device 61 includes a seventh working state and an eighth working state; in the seventh working state, the first port 61*a* communicates with the third port 61*c*; in the eighth working state, the first port 61*a* communicates with the second port 61*b*.

FIG. 8 shows that the thermal management system of this embodiment is in the battery rapid heat dissipation mode. In the battery rapid heat dissipation mode, the first throttling device 31 is in the throttling state; the second throttling device 32 is in the throttling state; the third throttling device 33 is in the cut-off state; the third flow path switching device 63 is in the third working state; the fourth flow path switching device 64 is in the fifth working state; the sixteenth port 65*a* of the fifth path switching device 65 communicates with the eighteenth port 65*c*; the sixteenth port 65*a* is not in communication with the seventeenth port 65*b*; and the first flow path switching device 61 is in the seventh working state.

The circulation path of the primary refrigerant system and the circulation path of the secondary refrigerant system in the battery rapid heat dissipation mode of this embodiment are the same as the circulation path of the primary refrigerant system and the circulation path of the secondary refrigerant system in the rapid battery cooling mode of the embodiment shown in FIG. 1, respectively. Reference may be made to related descriptions, and details are not repeated here. The circulation path of the primary coolant includes: the motor heat exchange assembly 42, the fifth pump 55, the seventh heat exchange portion 171, the sixth heat exchanger 16 and the tenth heat exchange portion 192 are communicated to form a loop; one end of the fourth flow path f communicates with the fourteenth port 64*c*; the other end of the fourth flow path f communicates with the fifteenth port 64*d*; the fourth flow path f is not in communication with the flow path where the battery heat exchange assembly 41 is located. The circulation path of the secondary coolant system includes: the first port 142*a* of the sixth heat exchange portion 142 communicates with the first port 151*a* of the first sub-heat exchanger 151; the first port 142*a* of the sixth heat exchange portion 142 communicates with the first port 152*a* of the second sub-heat exchanger 152; the second port 151*b* of the first sub-heat exchanger 151 communicates with the second port 142*b* of the sixth heat exchange portion 142; the second port 152*b* of the second sub-heat exchanger 152 communicates with the second port 142*b* of the sixth heat exchange portion 142; the battery heat exchange assembly 41 communicates with the fourth heat exchange portion 132; the fourth heat exchange portion 132 communicates with the thirteenth port 64*b*; the thirteenth port 64*b* communicates with the thirteenth port 64*a*; the thirteenth port 64*a* communicates with the second heat exchange portion 112; the second heat exchange portion 112 communicates with the third pump 53; and the third pump 53 communicates with the battery heat exchange assembly 41.

When the thermal management system of this embodiment is in the second cooling mode, the first path switching device 61 is in the seventh working state; the battery heat exchange assembly 41 communicates with the fourth heat exchange portion 132; the fourth heat exchange portion 132 communicates with the thirteenth port 64*b*; the thirteenth port 64*b* communicates with the thirteenth port 64*a*; the thirteenth port 64*a* communicates with the second heat exchange portion 112; the second heat exchange portion 112 communicates with the third pump 53; and the third pump 53 communicates with the battery heat exchange assembly 41. When the thermal management system of this embodiment is in the first cooling mode, the heating mode, the heating and dehumidification mode, and the demisting mode, the first flow path switching device 61 is in the eighth working state; the battery heat exchange assembly 41 communicates with the first branch c; the first branch c communicates with the thirteenth port 64*b*; the thirteenth port 64*b* communicates with the thirteenth port 64*a*; the thirteenth port 64*a* communicates with the second heat exchange portion 112; the second heat exchange portion 112 communicates with the third pump 53; and the third pump 53 communicates with the battery heat exchange assembly 41. The communication relationship of other components in each mode is the same as that of the above-mentioned embodiment.

In this embodiment, the battery heat exchange assembly 41, the second heat exchange portion 112 and the fourth heat exchange portion 132 can communicate to form a loop, so that the battery is capable of exchanging heat with the coolant flowing through the second heat exchange portion 112, and the battery can also exchange heat with the coolant flowing through the fourth heat exchange portion 132, which increases the way to adjust the temperature of the battery.

In this embodiment, the battery heat exchange assembly 41, the second heat exchange portion 112 and the fourth heat exchange portion 132 can communicate to form a loop. Compared with the parallel connection of the first flow path a and the second flow path b in the above embodiment, the battery heat exchange assembly 41, the second heat exchange portion 112 and the fourth heat exchange portion 132 being communicated to form the loop only needs to provide one pump, that is, the third pump 53. The parallel connection of the first flow path a and the second flow path b needs to provide a separate pump in each flow path, that is, the first pump 51 and the second pump 52. However, the flow rate of the third pump 53 is larger than that of the second pump 52; and the flow rate of the third pump 53 is larger than that of the first pump 51.

Figure 9:
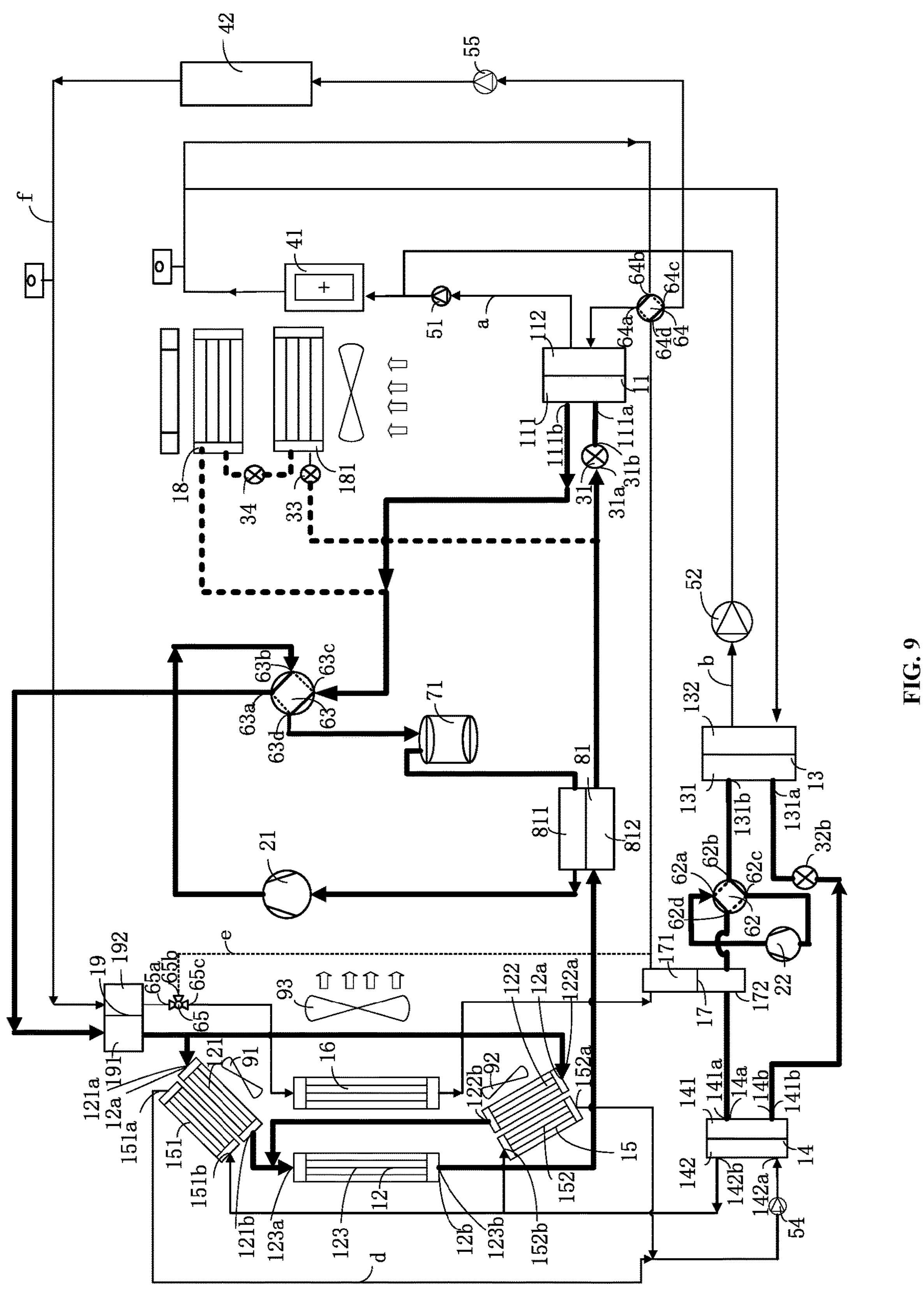
FIG. 9 is a schematic diagram of the working principle of the battery rapid heat dissipation mode in yet another embodiment of the thermal management system of the present disclosure.

According to another specific embodiment of the thermal management system of the present disclosure, as shown in FIG. 9, its structure is substantially the same as that of the above-mentioned embodiment, and its working principle is substantially the same as that of the above-mentioned embodiment. The differences between them are that the secondary refrigerant system further includes a second path switching device 62. The second flow path switching device 62 includes a fourth port 62*a*, a fifth port 62*b*, a sixth port 62*c* and a seventh port 62*d*; the fourth port 62*a* communicates with the outlet of the second compressor 22; the fifth port 62*b* communicates with the third heat exchange portion 131; the sixth port 62*c* communicates with the inlet of the second compressor 22; the seventh port 62*d* communicates with the fifth heat exchange portion 141. The second flow path switching device 62 includes a first working state and a second working state. In the first working state, the fourth port 62*a* communicates with the seventh port 62*d*; the fifth port 62*b* communicates with the sixth port 62*c*; the fourth port 62*a* is not in communication with the fifth port 62*b*; and the sixth port 62*c* is not in communication with the seventh port 62*d*. In the second working state, the fourth port 62*a* communicates with the fifth port 62*b*; the seventh port 62*d* communicates with the sixth port 62*c*; the fourth port 62*a* is not in communication with the seventh port 62*d*; and the fifth port 62*b* is not in communication with the sixth port 62*c*.

Referring to FIG. 9, in the battery rapid heat dissipation mode, the first throttling device 31 is in the throttling state; the second throttling device 32 is in the throttling state; the third throttling device 33 is in the cut-off state; the third flow path switching device 63 is in the third working state; the fourth flow path switching device 64 is in the fifth working state; the sixteenth port 65*a* of the fifth path switching device 65 communicates with the eighteenth port 65*c*; the sixteenth port 65*a* is not in communication with the seventeenth port 65*b*; the second flow path switching device 62 is in the first working state; the first pump 51 is turned on; the second pump 52 is turned on; the fourth pump 54 is turned on; and the fifth pump 55 is turned on.

The circulation path of the primary refrigerant system, the circulation path of the primary coolant and the circulation path of the secondary coolant in the battery rapid heat dissipation mode of this embodiment are the same as the circulation path of the primary refrigerant system, the circulation path of the primary coolant and the circulation path of the secondary coolant in the battery rapid heat dissipation mode of the embodiment shown in FIG. 1. Reference may be made to related descriptions, and details are not repeated here. The circulation path of the secondary refrigerant system is: the outlet of the second compressor 22 communicates with the fourth port 62*a*; the fourth port 62*a* communicates with the seventh port 62*d*; the seventh port 62*d* communicates with the first port 172*a* of the eighth heat exchange portion 172; the second port 172*b* of the eighth heat exchange portion 172 communicates with the first port 141*a* of the fifth heat exchange portion 141; the second port 141*b* of the fifth heat exchange portion 141 communicates with the first port 32*a* of the second throttling device 32; the second port 32*b* of the second throttling device 32 communicates with the third heat exchange portion 131; the third heat exchange portion 131 communicates with the fifth port 62*b*; the fifth port 62*b* communicates with the sixth port 62*c*; and the sixth port 62*c* communicates with the inlet of the second compressor 22.

In this embodiment, the thermal management system further includes the battery rapid heat absorption mode. When the battery in the vehicle needs to heat up quickly, such as when a pure electric vehicle is parked and fast-charged in winter, in order to ensure that the battery can work normally, the thermal management system needs to quickly heat up the battery. At this time, the thermal management system can start the battery rapid heat absorption mode.

Figure 10:
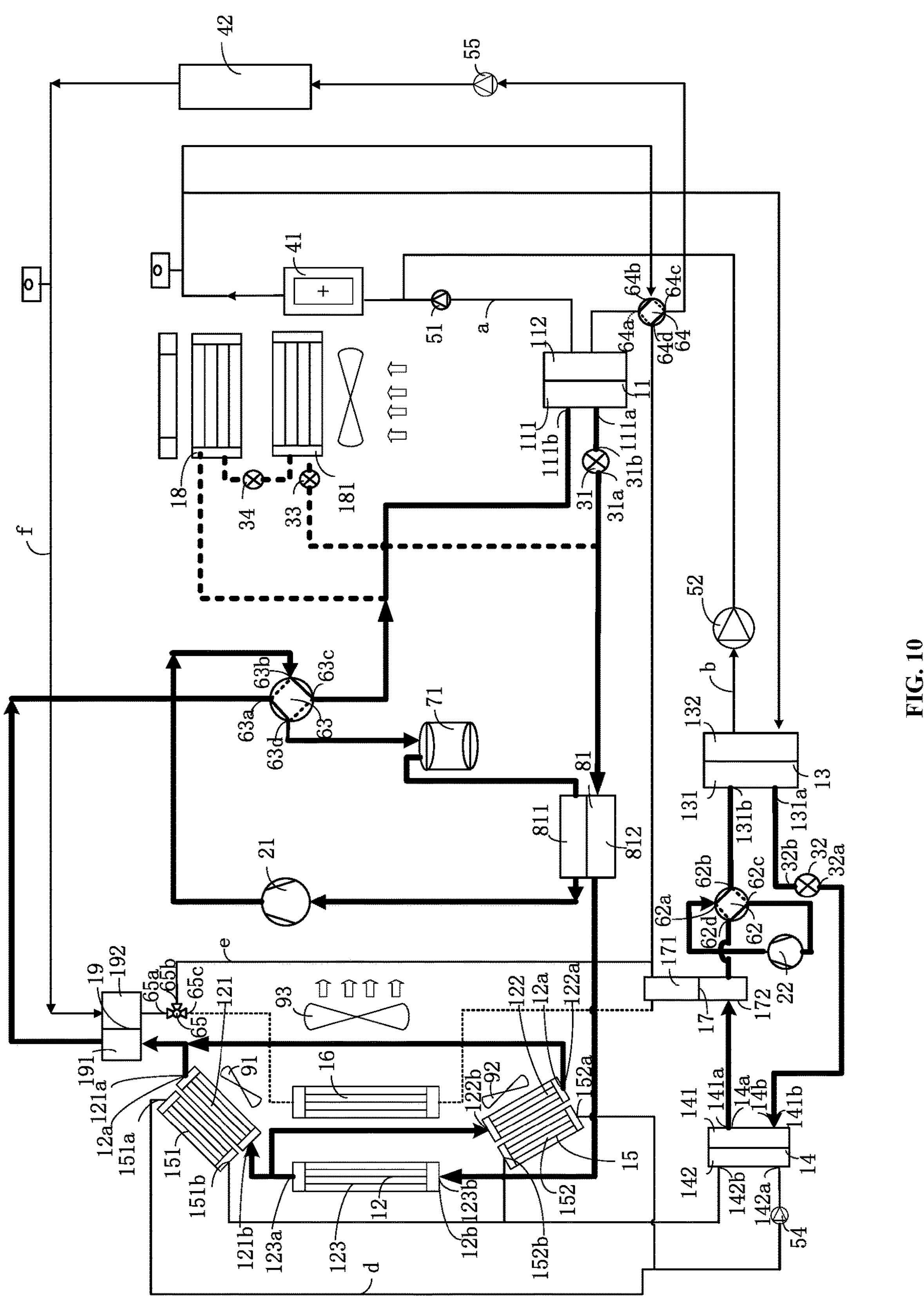
FIG. 10 is a schematic diagram of the working principle of the battery rapid heat absorption mode in yet another embodiment of the thermal management system of the present disclosure.

Referring to FIG. 10, in the battery rapid heat absorption mode, the first throttling device 31 is in the throttling state; the second throttling device 32 is in the throttling state; the third throttling device 33 is in the cut-off state; the second flow path switching device 62 is in the second working state; the third flow path switching device 63 is in the fourth working state; the fifth flow path switching device 65 is in the fifth working state; the first pump 51 is turned on; the second pump 52 is turned on; the fourth pump 54 is turned on; and the fifth pump 55 is turned on.

The circulation path of the primary refrigerant system is as follows: the outlet of the first compressor 21 communicates with the ninth port 63*b*; the ninth port 63*b* communicates with the tenth port 63*c*; the tenth port 63*c* communicates with the first heat exchange portion 111; the first heat exchange portion 111 communicates with the second heat exchange portion 812; the second heat exchange portion 812 communicates with the fifth sub-heat exchanger 123; the fifth sub-heat exchanger 123 communicates with the third sub-heat exchanger 121; the fifth sub-heat exchanger 123 communicates with the fourth sub-heat exchanger 122; the third sub-heat exchanger 121 communicates with the ninth heat exchange portion 191; the fourth sub-heat exchanger 122 communicates with the ninth heat exchange portion 191; the ninth heat exchange portion 191 communicates with the eighth port 63*a*; the eighth port 63*a* communicates with the ninth port 63*b*; the ninth port 63*b* communicates with the gas-liquid separator 71; the gas-liquid separator 71 communicates with the first heat exchange portion 811; and the first heat exchange portion 811 communicates with the inlet of the first compressor 21. In the primary coolant system, the first pump 51, the battery heat exchange assembly 41 and the second heat exchange portion 112 are sequentially connected to form a circuit. The motor heat exchange assembly 42, the tenth heat exchange portion 192, and the second branch e are communicated in sequence to form a loop.

The circulation path of the secondary refrigerant system is as follows: the second compressor 22, the fourth port 62*a*, the fifth port 62*b*, the third heat exchange portion 131, the second throttling device 32, the fifth heat exchange portion 141 and the eighth heat exchange portion 172 are communicated in sequence to form a loop. The circulation path of the secondary coolant system is as follows: the fourth heat exchange portion 132, the second pump 52 and the battery heat exchange assembly 41 are communicated in sequence to form a loop; the first port 142*a* of the sixth heat exchange portion 142 communicates with the first port 151*a* of the first sub-heat exchanger 151; the first port 142*a* of the sixth heat exchange portion 142 communicates with the first port 152*a* of the second sub-heat exchanger 152; the second port 151*b* of the first sub-heat exchanger 151 communicates with the second port 142*b* of the sixth heat exchange portion 142; and the second port 152*b* of the second sub-heat exchanger 152 communicates with the second port 142*b* of the sixth heat exchange portion 142.

In the battery rapid heat absorption mode, the first heat exchanger 11 and the third heat exchanger 13 are condensers; the third sub-heat exchanger 121, the fourth sub-heat exchanger 122, the fifth sub-heat exchanger 123 and the fourth heat exchanger 14 are evaporators. The battery heat exchange assembly 41 communicates with the second heat exchange portion 112; the coolant circulating in the second heat exchange portion 112 can absorb the heat of the refrigerant circulating in the first heat exchange portion 111, so that the battery can absorb the heat of the refrigerant in the first heat exchange portion 111. The battery heat exchange assembly 41 communicates with the fourth heat exchange portion 132; the coolant circulating in the fourth heat exchange portion 132 can absorb the heat of the refrigerant circulating in the third heat exchange portion 131, so that the battery can absorb the heat of the refrigerant in the third heat exchange portion 131. That is, the battery can absorb the heat of the refrigerant in the first heat exchange portion 111 and the third heat exchange portion 131 at the same time, so that the temperature of the battery can be raised rapidly.

The thermal management system in this application can turn on the primary and secondary systems at the same time in order to meet the demand when the battery needs to quickly dissipate heat or quickly absorb heat; or can only turn on the primary system under normal working conditions. The normal working conditions include various working conditions in which the passenger compartment is thermally managed alone, and various working conditions in which the battery is only thermally managed through the primary system. This kind of setting can make each component in the thermal management system play its best performance under each working condition, and it is not necessary to make the selection of compressors and other components too large to meet special working conditions (such as a situation where the battery needs to quickly dissipate heat or absorb heat), resulting each component cannot exert its optimal performance under the normal working conditions.

It should be understood that the communication of two components in the present disclosure can be achieved by communicating the two components through a pipeline or a connecting member with a channel inside, or the communication of the two components can be directly contacted and connected to achieve communication. The parallel connection between one component (a flow path) and another component (another flow path) in the present disclosure means that a port (one end of the flow path) of one component communicates with a port (one end of another flow path) of another component. The other port of one component (the other end of the flow path) communicates with the other port of another component (the other end of another flow path). "A certain component communicates with a certain flow path" described in the present disclosure means that the flow path where the certain component is located is the certain flow path; the certain component is communicated between a first end and a second end of the certain flow path; and an internal flow channel of the certain component is part of the certain flow path.

The present disclosure further provides a control method of the thermal management system. The control method in the present disclosure is applied to the thermal management system of the above-mentioned embodiments. The thermal management system further includes a control system 100. The control system 100 can be used to control the working state of the refrigerant system and the working state of the coolant system.

Referring to FIG. 1, the control system 100 includes a controller 200 and a plurality of sensors. The plurality of sensors are used to obtain the operating information of the various heat exchangers, motors, and batteries. Optionally, the operating information includes temperature. The controller 200 is electrically connected to the components, such as the first compressor 21, the second compressor 22, multiple throttling devices, multiple flow path switching devices, multiple pumps, multiple air supply devices and multiple sensors. The controller 200 can be used to obtain the operating information obtained by the sensors. The controller 200 can be used to adjust the working states of the above-mentioned electrically connected components. The adjustment of the working state includes at least one of opening the components, closing the components, speed adjustment, opening adjustment and power adjustment. The controller 200 can be used to implement the control method of the thermal management system.

The control method of the thermal management system includes:

obtaining passenger's requirements and the operating information obtained by the sensors; and according to the passenger's requirements and the operating information obtained from the sensors, adjusting the working status of each component in the thermal management system by the controller 200, so that the thermal management system executes an appropriate air-conditioning operating mode, thereby realizing the thermal management of the passenger compartment, the motor and the battery.

The thermal management system further includes an interaction device. The controller 200 is electrically connected to the interaction device. The controller 200 can obtain the passenger's requirements through the interaction device, such as a target temperature or an operating mode required by the passenger. Optionally, the interaction device may be a control panel of the electric vehicle. The operating modes of the air conditioner include the battery rapid heat dissipation mode, the battery rapid heating mode, the cooling mode, the heating mode, the heating and dehumidification mode, and the defrosting mode. For the connection status of the thermal management system in the battery rapid heat dissipation mode, the battery rapid heating mode, the cooling mode, the heating mode, the heating and dehumidification mode, and the defrosting mode can be referred to the previous description of the thermal management system, and will not be repeated here.

The above descriptions are only preferred embodiments of the present disclosure, and are not intended to limit the present disclosure in any form. Although the disclosure has been disclosed above with preferred embodiments, it is not intended to limit the present disclosure. Any skilled in the art may use the technical contents disclosed above to make some changes or modify them into equivalent embodiments without departing from the scope of the technical solutions disclosed in the present disclosure. However, any simple modifications, equivalent changes and modifications made to the above embodiments based on the technical essence of the present disclosure are still within the scope of the technical solution of the present disclosure.

What is claimed is:

1. A thermal management system, comprising: a primary system and a secondary system;

the primary system comprising a primary refrigerant system and a primary coolant system; the primary system comprising a first heat exchanger; the first heat exchanger comprising a first heat exchange portion and a second heat exchange portion which are not communicated; the first heat exchange portion and the second heat exchange portion being configured to perform heat exchange; the primary refrigerant system comprising a first compressor, a second heat exchanger, a first throttler and the first heat exchange portion; the primary coolant system comprising the second heat exchange portion;

the secondary system comprising a secondary refrigerant system and a secondary coolant system; the secondary system comprising a third heat exchanger; the third heat exchanger comprising a third heat exchange portion and a fourth heat exchange portion which are not communicated; the third heat exchange portion and the fourth heat exchange portion being configured to perform heat exchange; the secondary refrigerant system comprising a second compressor, a fourth heat exchanger, a second throttler and the third heat exchange portion; the secondary coolant system comprising the fourth heat exchange portion;

the thermal management system comprising a battery heat exchange assembly;

the thermal management system having a battery rapid heat dissipation mode; wherein in the battery rapid heat dissipation mode: an outlet of the first compressor communicates with a first port of the second heat exchanger; a second port of the second heat exchanger communicates with a first port of the first throttler; a second port of the first throttler communicates with a first port of the first heat exchange portion; a second port of the first heat exchange portion communicates with an inlet of the first compressor; the battery heat exchange assembly communicates with the second heat exchange portion;

an outlet of the second compressor communicates with a first port of the fourth heat exchanger; a second port of the fourth heat exchanger communicates with a first port of the second throttler; a second port of the second throttler communicates with a first port of the third heat exchange portion; a second port of the third heat exchange portion communicates with an inlet of the second compressor; the battery heat exchange assembly communicates with the fourth heat exchange portion;

wherein the fourth heat exchanger comprises a fifth heat exchange portion and a sixth heat exchange portion which are not communicated; the fifth heat exchange portion and the sixth heat exchange portion are configured to perform heat exchange;

the secondary coolant system comprises a fifth heat exchanger and a third flow path; the fifth heat exchanger and the sixth heat exchange portion are in communication with the third flow path; the third flow path is not in communication with a flow path where the battery heat exchange assembly is located;

in the battery rapid heat dissipation mode: the fifth heat exchanger communicates with the sixth heat exchange portion.

2. The thermal management system according to claim 1, wherein the thermal management system comprises a controller; the battery rapid heat dissipation mode is executed under the control of the controller; the primary coolant system comprises a first flow path and a first pump; the first pump communicates with the second heat exchange portion in the first flow path; the secondary coolant system comprises a second flow path and a second pump; the second pump communicates with the fourth heat exchange portion in the second flow path;

in the battery rapid heat dissipation mode: the first flow path communicates with the battery heat exchange assembly to form a loop; the second flow path communicates with the battery heat exchange assembly to form a loop; after flowing through the battery heat exchange assembly, coolant is divided into two paths, in which one path flows to the first flow path, and the other path flows to the second flow path, the coolant flowing through the first flow path and the coolant flowing through the second flow path merge and flow together to the battery heat exchange assembly.

3. The thermal management system according to claim 1, wherein the thermal management system comprises a third pump;

in the battery rapid heat dissipation mode: the battery heat exchange assembly, the third pump, the second heat exchange portion and the fourth heat exchange portion are communicated.

4. The thermal management system according to claim 3, wherein the thermal management system comprises a first branch;

the thermal management system comprises a first flow path switcher; the first flow path switcher comprises a first port, a second port and a third port; the first port is capable of communicating with the battery heat exchange assembly, the second port communicates with the first branch; the third port communicates with the fourth heat exchange portion;

in the battery rapid heat dissipation mode: the first port communicates with the third port; the first port is not in communication with the second port; the first port communicates with the battery heat exchange assembly; the battery heat exchange assembly, the second heat exchange portion and the third pump communicate with the fourth heat exchange portion.

5. The thermal management system according to claim 1, wherein the fifth heat exchanger comprises a first sub-heat exchanger and a second sub-heat exchanger;

in the battery rapid heat dissipation mode: a first port of the first sub-heat exchanger communicates with a first port of the sixth heat exchange portion; a first port of the second sub-heat exchanger communicates with the first port of the sixth heat exchange portion; a second port of the first sub-heat exchanger communicates with a second port of the sixth heat exchange portion; a second port of the second sub-heat exchanger communicates with the second port of the sixth heat exchange portion.

6. The thermal management system according to claim 5, wherein the second heat exchanger comprises a third sub-heat exchanger, a fourth sub-heat exchanger and a fifth sub-heat exchanger;

in the battery rapid heat dissipation mode: the first port of the third sub-heat exchanger communicates with the inlet of the first compressor; a first port of the fourth sub-heat exchanger communicates with the inlet of the first compressor; a second port of the third sub-heat exchanger communicates with a first port of the fifth sub-heat exchanger; a second port of the fourth sub-heat exchanger communicates with the first port of the fifth sub-heat exchanger; a second port of the fifth sub-heat exchanger communicates with the first port of the first throttler.

7. The thermal management system according to claim 6, wherein the primary coolant system further comprises a motor heat exchange assembly and a sixth heat exchanger;

in the battery rapid heat dissipation mode: the motor heat exchange assembly communicates with the sixth heat exchanger.

8. The thermal management system according to claim 7, wherein the third sub-heat exchanger and the fourth sub-heat exchanger are located on opposite sides of the fifth sub-heat exchanger in a length direction, respectively; a length direction of the third sub-heat exchanger intersects the length direction of the fifth sub-heat exchanger at a first point; the third sub-heat exchanger is rotated by a first angle $\alpha$ around the first point relative to the fifth sub-heat exchanger; a length direction of the fourth sub-heat exchanger intersects the length direction of the fifth sub-heat exchanger at a second point; the fourth sub-heat exchanger is rotated by a second angle $\beta$ around the second point relative to the fifth sub-heat exchanger; both the first angle $\alpha$ and the second angle $\beta$ are obtuse angles.

9. The thermal management system according to claim 8, wherein the first sub-heat exchanger and the second sub-heat exchanger are located on opposite sides of the fifth sub-heat exchanger in the length direction, respectively; the sixth heat exchanger is located between the first sub-heat exchanger and the second sub-heat exchanger;

the thermal management system further comprises a first air supplier, a second air supplier and a third air supplier; the first air supplier, the third sub-heat exchanger and the first sub-heat exchanger are disposed side by side; the second air supplier, the fourth sub-heat exchanger and the second sub-heat exchanger are disposed side by side; the third air supplier, the fifth sub-heat exchanger and the sixth heat exchanger are disposed side by side;

the air sent by the first air supplier is capable of flowing through the first sub-heat exchanger and the third sub-heat exchanger; the air sent by the second air supplier is capable of flowing through the second sub-heat exchanger and the fourth sub-heat exchanger; the air sent by the third air supplier is capable of flowing through the fifth sub-heat exchanger and the sixth heat exchanger; along an air supply direction of the first air supplier, the third sub-heat exchanger is located in front of the first sub-heat exchanger, and the third sub-heat exchanger is located between the first sub-heat exchanger and the first air supplier; along an air supply direction of the second air supplier, the fourth sub-heat exchanger is located in front of the second sub-heat exchanger, and the fourth sub-heat exchanger is located between the second sub-heat exchanger and the second air supplier; along an air supply direction of the third air supplier, the sixth heat exchanger is located in front of the fifth sub-heat exchanger, and the sixth heat exchanger is located between the fifth sub-heat exchanger and the third air supplier;

a length direction of the first sub-heat exchanger is parallel to the length direction of the third sub-heat exchanger; a length direction of the second sub-heat exchanger is parallel to the length direction of the fourth sub-heat exchanger; a length direction of the sixth heat exchanger is parallel to the length direction of the fifth sub-heat exchanger; the air supply direction of the first air supplier is perpendicular to the length direction of the third sub-heat exchanger; the air supply direction of the second air supplier is perpendicular to the length direction of the fourth sub-heat exchanger; the air supply direction of the third air supplier is perpendicular to the length direction of the fifth sub-heat exchanger.

10. The thermal management system according to claim 9, wherein the thermal management system further comprises a seventh heat exchanger; the seventh heat exchanger comprises a seventh heat exchange portion and an eighth heat exchange portion which are not communicated; the seventh heat exchange portion is configured to perform heat exchange with the eighth heat exchange portion;

in the battery rapid heat dissipation mode: the seventh heat exchange portion communicates with the sixth heat exchanger; the eighth heat exchange portion is communicated between the outlet of the second compressor and the first port of the second throttler.

11. A thermal management system, comprising: a primary system and a secondary system;

the primary system comprising a primary refrigerant system and a primary coolant system; the primary system comprising a first heat exchanger; the first heat exchanger comprising a first heat exchange portion and a second heat exchange portion which are not communicated; the first heat exchange portion and the second heat exchange portion being configured to perform heat exchange; the primary refrigerant system comprising a first compressor, a second heat exchanger, a first throttler and the first heat exchange portion; the primary coolant system comprising the second heat exchange portion;

the secondary system comprising a secondary refrigerant system and a secondary coolant system; the secondary system comprising a third heat exchanger; the third heat exchanger comprising a third heat exchange portion and a fourth heat exchange portion which are not communicated; the third heat exchange portion and the fourth heat exchange portion being configured to perform heat exchange; the secondary refrigerant system comprising a second compressor, a fourth heat exchanger, a second throttler and the third heat exchange portion; the secondary coolant system comprising the fourth heat exchange portion;

the thermal management system comprising a battery heat exchange assembly;

the thermal management system having a battery rapid heat dissipation mode; wherein in the battery rapid heat dissipation mode: an outlet of the first compressor communicates with a first port of the second heat exchanger; a second port of the second heat exchanger communicates with a first port of the first throttler; a second port of the first throttler communicates with a first port of the first heat exchange portion; a second port of the first heat exchange portion communicates with an inlet of the first compressor; the battery heat exchange assembly communicates with the second heat exchange portion;

an outlet of the second compressor communicates with a first port of the fourth heat exchanger; a second port of the fourth heat exchanger communicates with a first port of the second throttler; a second port of the second throttler communicates with a first port of the third heat exchange portion; a second port of the third heat exchange portion communicates with an inlet of the second compressor; the battery heat exchange assembly communicates with the fourth heat exchange portion;

wherein the secondary refrigerant system further comprises a second flow path switcher; the second flow path switcher comprises a fourth port, a fifth port, a sixth port and a seventh port; the fourth port communicates with the outlet of the second compressor; the fifth port communicates with the third heat exchange portion; the sixth port communicates with the inlet of the second compressor; the seventh port communicates with the fourth heat exchanger;

the second flow path switcher comprises a first working state and a second working state; in the first working state, the fourth port communicates with the seventh port; the fifth port communicates with the sixth port; the fourth port is not in communication with the fifth port; the sixth port is not in communication with the seventh port;

in the second working state, the fourth port communicates with the fifth port; the seventh port communicates with the sixth port; the fourth port is not in communication with the seventh port; the fifth port is not in communication with the sixth port.

12. The thermal management system according to claim 11, wherein the thermal management system further comprises a battery rapid heat absorption mode; in the battery rapid heat absorption mode: the outlet of the first compressor communicates with the second port of the first heat exchange portion; the first port of the first heat exchange portion communicates with the second port of the first throttler; the first port of the first throttler communicates with the second port of the second heat exchanger; the first port of the second heat exchanger communicates with the inlet of the first compressor;

the outlet of the second compressor communicates with the fourth port of the second flow path switcher; the fifth port of the second flow path switcher communicates with the second port of the third heat exchange portion; the first port of the third heat exchange portion communicates with the second port of the second throttler; the first port of the second throttler communicates with the second port of the fourth heat exchanger, the first port of the fourth heat exchanger communicates with the seventh port of the second flow path switcher; the sixth port of the second flow path switcher communicates with the inlet of the second compressor; the second flow path switcher is in the second working state.

13. The thermal management system according to claim 11, wherein the thermal management system comprises a controller; the battery rapid heat dissipation mode is executed under the control of the controller; the primary coolant system comprises a first flow path and a first pump; the first pump communicates with the second heat exchange portion in the first flow path; the secondary coolant system comprises a second flow path and a second pump; the second pump communicates with the fourth heat exchange portion in the second flow path;

in the battery rapid heat dissipation mode: the first flow path communicates with the battery heat exchange assembly to form a loop; the second flow path communicates with the battery heat exchange assembly to form a loop; after flowing through the battery heat exchange assembly, coolant is divided into two paths, in which one path flows to the first flow path, and the other path flows to the second flow path; the coolant flowing through the first flow path and the coolant flowing through the second flow path merge and flow together to the battery heat exchange assembly.

14. The thermal management system according to claim 11, wherein the thermal management system comprises a third pump;

in the battery rapid heat dissipation mode: the battery heat exchange assembly, the third pump, the second heat exchange portion and the fourth heat exchange portion are communicated.

15. The thermal management system according to claim 14, wherein the thermal management system comprises a first branch;

the thermal management system comprises a first flow path switcher; the first flow path switcher comprises a first port, a second port and a third port; the first port is capable of communicating with the battery heat exchange assembly; the second port communicates with the first branch; the third port communicates with the fourth heat exchange portion;

in the battery rapid heat dissipation mode: the first port communicates with the third port; the first port is not in communication with the second port; the first port communicates with the battery heat exchange assembly; the battery heat exchange assembly, the second heat exchange portion and the third pump communicate with the fourth heat exchange portion.

* * * * *